US005959629A

United States Patent [19]

Masui

[11] Patent Number: 5,959,629

[45] **Date of Patent: *Sep. 28, 1999**

[54] TEXT INPUT DEVICE AND METHOD

[75] Inventor: Toshiyuki Masui, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,971

[22] Filed: Nov. 12, 1997

[30] Foreign Application Priority Data

Nov. 25, 1996 [JP] Japan .................................... 8-314012

[51] Int. Cl.[6] ............................ G06F 17/24; G06F 19/00; G06F 3/033

[52] U.S. Cl. .......................... 345/347; 345/358; 345/338; 345/179; 345/352; 707/532; 707/534; 707/541

[58] Field of Search .................................... 345/336, 338, 345/145, 157, 179, 358, 347; 382/187, 189; 707/532, 534, 541

[56] References Cited

U.S. PATENT DOCUMENTS 5,557,789 9/1996 Mase et al. ................................ 707/1
5,724,457 3/1998 Fukushima ................................ 382/34
5,734,749 3/1998 Yamada et al. ........................ 382/187
5,778,404 7/1998 Capps et al. ............................ 707/531
5,805,167 9/1998 van Cruyningen ..................... 345/353

*Primary Examiner*—Raymond J. Bayerl
*Assistant Examiner*—Cuong T. Thai
*Attorney, Agent, or Firm*—Limbach & Limbach L.L.P.

[57] ABSTRACT

A text input device and method is disclosed which enables efficient and high-speed input of texts in a pen-input computer. A pen-input computer has a liquid crystal display panel, a ROM storing plural words and plural exemplary phrases, a pressure-sensitive tablet and an input pen for performing input to a soft keyboard displayed on the liquid crystal display panel and selection of candidate words displayed as a pull-down menu or pop-up menu, and a CPU for retrieving a candidate word displayed on the liquid crystal display panel on the basis of the input from the pressure-sensitive tablet and the input pen and/or a determined character array, so that text input is performed by selecting a desired word by the pressure-sensitive tablet and the input pen from the candidate words displayed on the liquid crystal display panel.

28 Claims, 27 Drawing Sheets

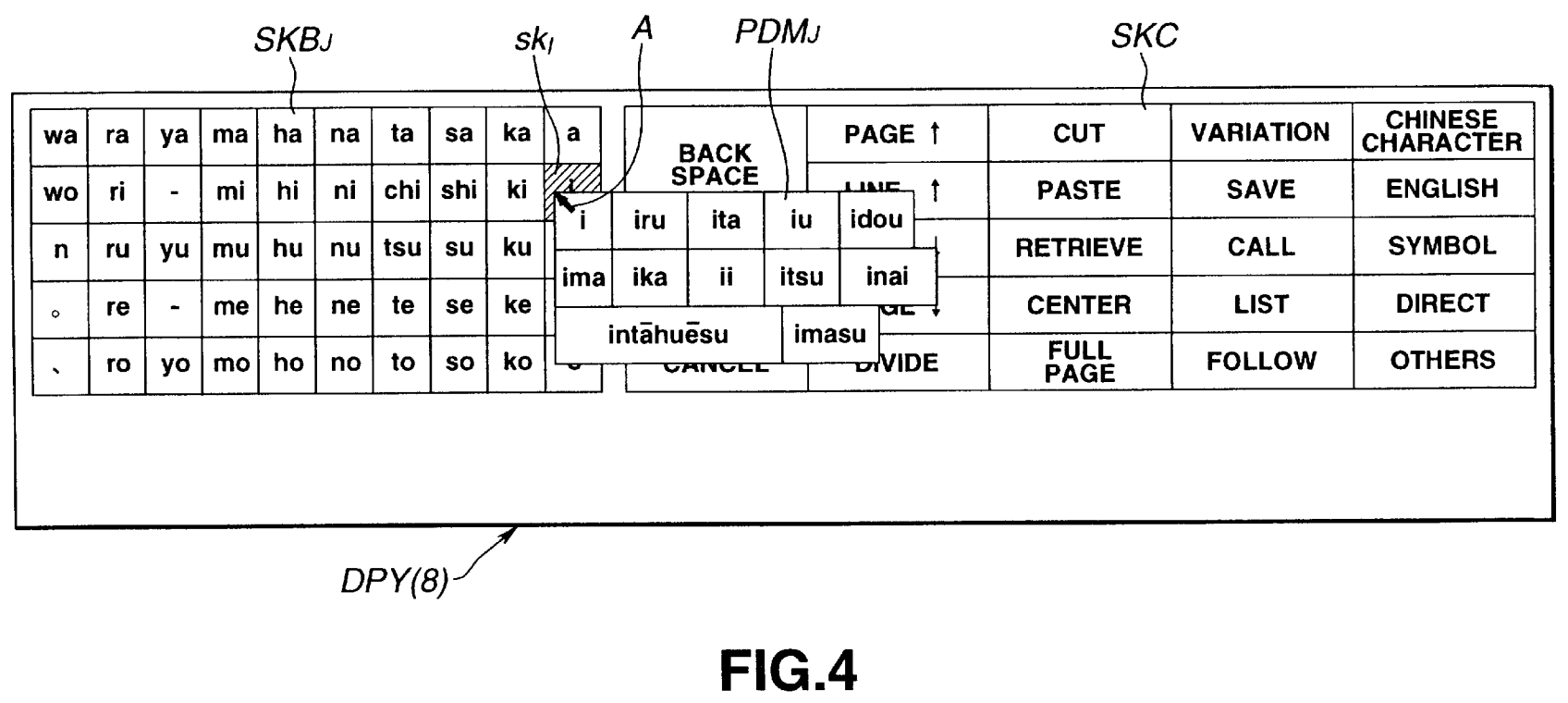

SKC PDMJ A skI SKBJ DPY(8)

CHINESE CHARACTER, ENGLISH, SYMBOL, DIRECT, OTHERS

VARIATION, SAVE, CALL, LIST, FOLLOW

CUT, PASTE, RETRIEVE, CENTER, FULL PAGE

PAGE ↑, DIVIDE, BACK SPACE idou, iu, ita, iru, i inai, itsu, ii, ika, ima imasu, intāhuēsu a ka sa ta na ha ma ya ra wa ki shi chi ni hi mi - ri wo ku su tsu nu hu mu yu ru n ke se te ne he me - re 。 ko so to no ho mo yo ro 、

FIG.4

SKBJ

SKC

| wa | ra | ya | ma | ha | na | ta | sa | ka | a |
|---|---|---|---|---|---|---|---|---|---|
| wo | ri | - | mi | hi | ni | chi | shi | ki | i |
| n | ru | yu | mu | hu | nu | tsu | su | ku | u |
| 。 | re | - | me | he | ne | te | se | ke | e |
| 、 | ro | yo | mo | ho | no | to | so | ko | o |

| | | | | |
|---|---|---|---|---|
| BACK SPACE | PAGE ↑ | CUT | VARIATION | CHINESE CHARACTER |
| | LINE ↑ | PASTE | SAVE | ENGLISH |
| ENTER | LINE ↓ | RETRIEVE | CALL | SYMBOL |
| | PAGE ↓ | CENTER | LIST | DIRECT |
| CANCEL | DIVIDE | FULL PAGE | FOLLOW | OTHERS |

| i | ima | intāhuēsu | iru | ika | ita | ii | iu | itsu |
|---|---|---|---|---|---|---|---|---|

| imasu | idou | inai | identeki | ichi | iki | itsumo | izen | imi |
|---|---|---|---|---|---|---|---|---|

DPY(8)

PUMJ

FIG.5

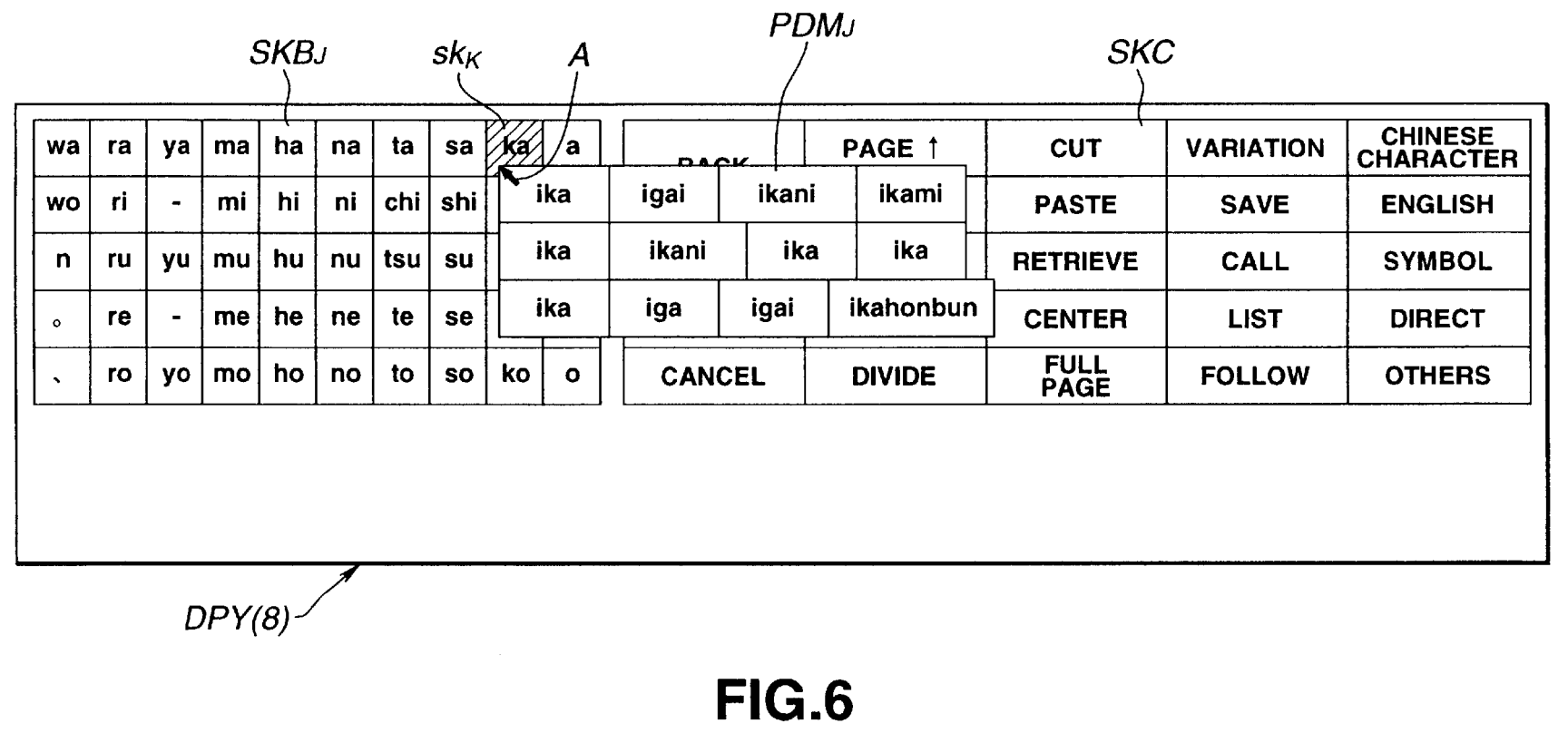

SKC

PDMJ

A skK

SKBJ

DPY(8)

CHINESE CHARACTER
ENGLISH
SYMBOL
DIRECT
OTHERS
VARIATION
SAVE
CALL
LIST
FOLLOW
CUT
PASTE
RETRIEVE
CENTER
FULL PAGE
PAGE ↑
DIVIDE
BACK
CANCEL ikami ika ikahonbun
ikani ika igai
igai ikani iga
ika ika ika a ka sa ta na ha ma ya ra wa
shi chi ni hi mi - ri wo
su tsu nu hu mu yu ru n
se te ne he me - re 。
o ko so to no ho mo yo ro 、

FIG.6

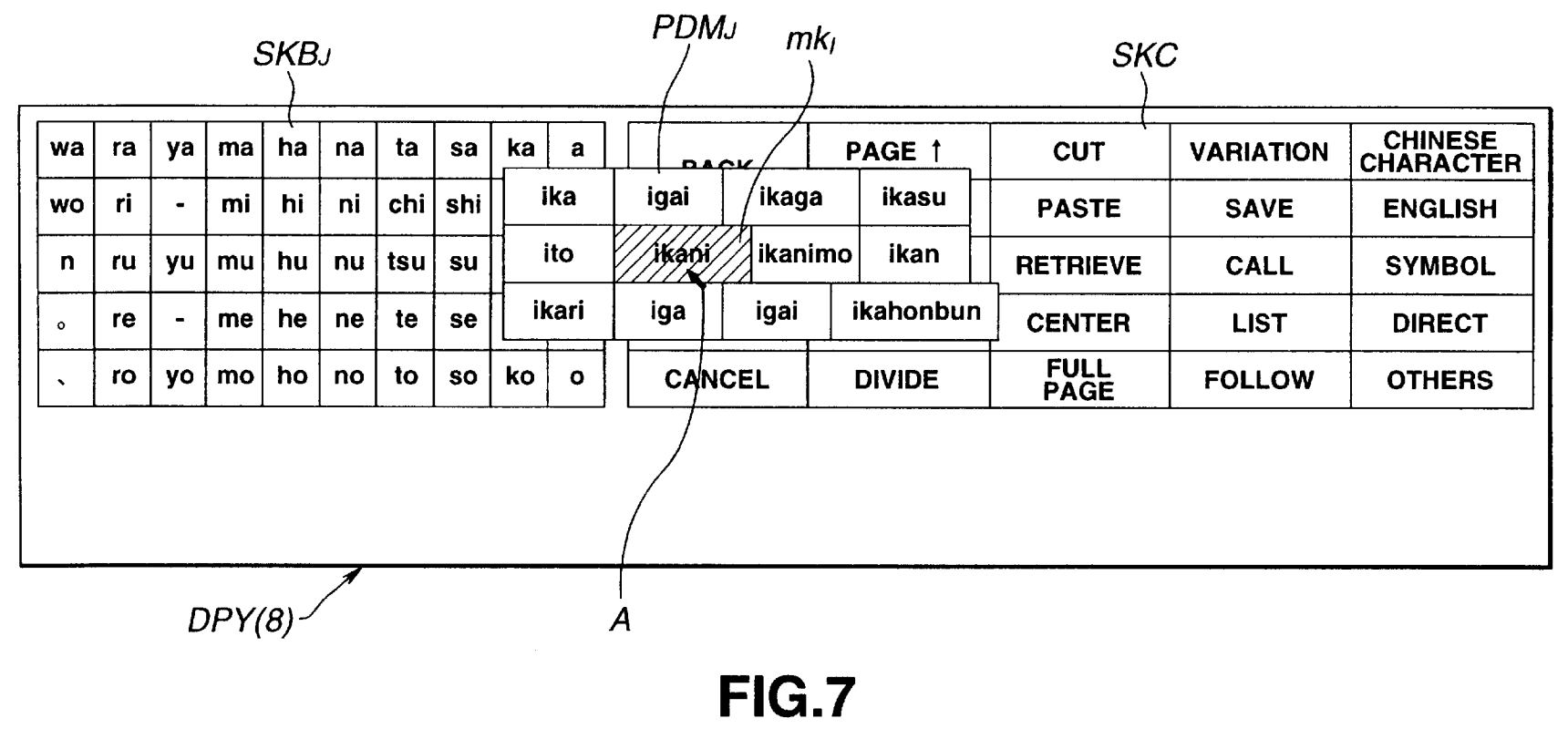

SKC
CHINESE CHARACTER
ENGLISH
SYMBOL
DIRECT
OTHERS
VARIATION
SAVE
CALL
LIST
FOLLOW
CUT
PASTE
RETRIEVE
CENTER
FULL PAGE
PAGE ↑
DIVIDE
CANCEL
ikasu
ikan
ikahonbun
ikaga
ikanimo
igai
igai
ikari
iga
ika
ito
ikari
mk$_I$
PDM$_J$
A
SKB$_J$
DPY(8)
wa ra ya ma ha na ta sa ka a
wo ri - mi hi ni chi shi
n ru yu mu hu nu tsu su
。 re - me he ne te se
、 ro yo mo ho no to so ko o

FIG.7

| wa | ra | ya | ma | ha | na | ta | sa | ka | a |
|---|---|---|---|---|---|---|---|---|---|
| wo | ri | - | mi | hi | ni | chi | shi | ki | i |
| n | ru | yu | mu | hu | nu | tsu | su | ku | u |
| 。 | re | - | me | he | ne | te | se | ke | e |
| 、 | ro | yo | mo | ho | no | to | so | ko | o |

| BACK SPACE | PAGE ↑ | CUT | VARIATION | CHINESE CHARACTER |
|---|---|---|---|---|
| | LINE ↑ | PASTE | SAVE | ENGLISH |
| ENTER | LINE ↓ | RETRIEVE | CALL | SYMBOL |
| | PAGE ↓ | CENTER | LIST | DIRECT |
| CANCEL | DIVIDE | FULL PAGE | FOLLOW | OTHERS |

| wa | wo | wobunshohenshū | watanjun | no | ga | womochiite | to | wotekiyou | ni |
|---|---|---|---|---|---|---|---|---|---|

| nokirikae | niyori | woteian | wotsukau | nitsuite | noyūgou | de |
|---|---|---|---|---|---|---|

SKBJ
SKC
PUMJ
A
mkO
DPY(8)

FIG.9

Figure 10:
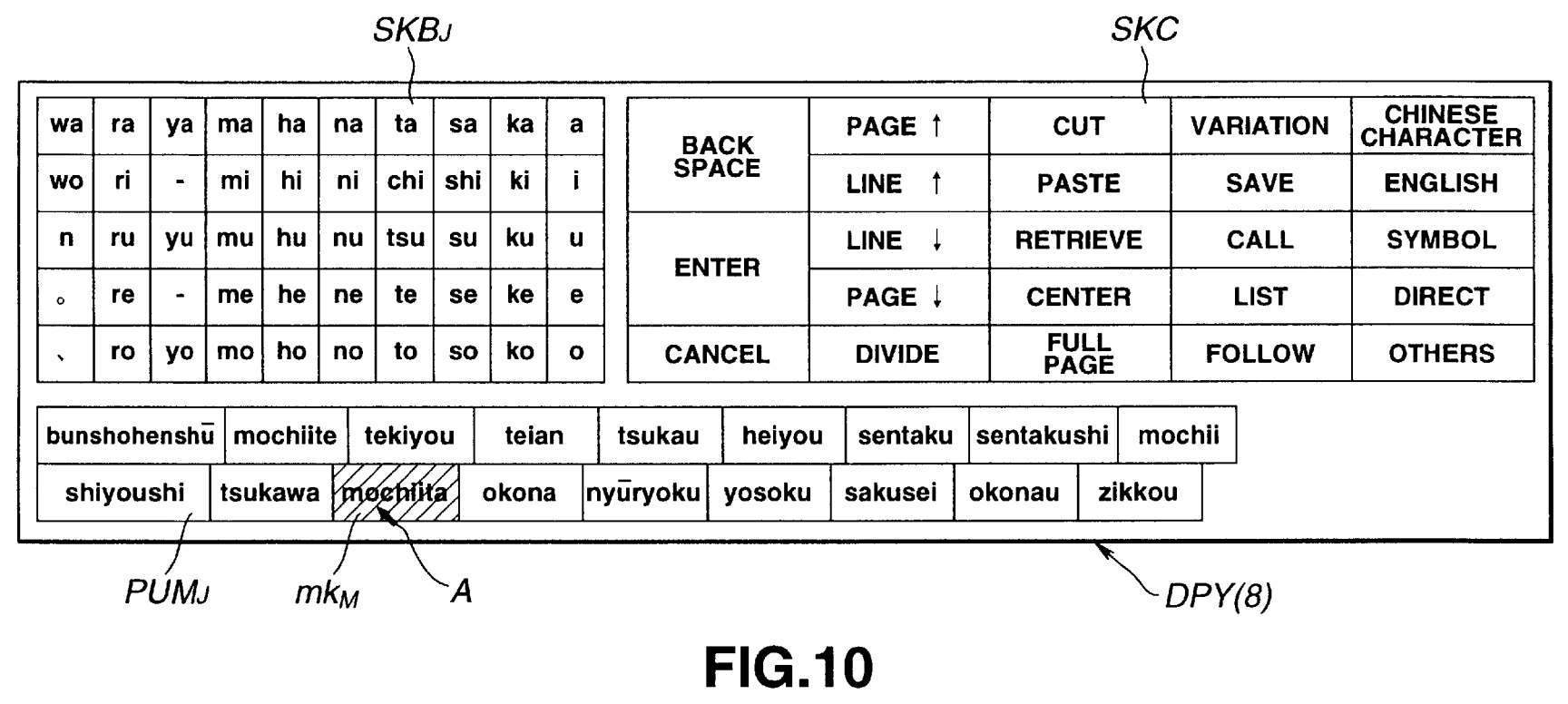

SKC
SKBJ
CHINESE CHARACTER
ENGLISH
SYMBOL
DIRECT
OTHERS
VARIATION
SAVE
CALL
LIST
FOLLOW
CUT
PASTE
RETRIEVE
CENTER
FULL PAGE
PAGE ↑
LINE ↑
LINE ↓
PAGE ↓
DIVIDE
BACK SPACE
ENTER
CANCEL
a i u e o
ka ki ku ke ko
sa shi su se so
ta chi tsu te to
na ni nu ne no
ha hi hu he ho
ma mi mu me mo
ya - yu - yo
ra ri ru re ro
wa wo n 。 、
bunshohenshū mochiite tekiyou teian tsukau heiyou sentaku sentakushi mochii
shiyoushi tsukawa mochiita okona nyūryoku yosoku sakusei okonau zikkou
DPY(8)
A
$mk_M$
$PUM_J$

FIG.10 suru / suru
shisutemu / shisutemu
sousa / sousa
masui / masui
yūza / yūza

FIG.15 iru / yatte / iru
inai / yatte / inai
masu / kake / masu
kake / ga / kake
ka / bunshou / ga

FIG.16

| INPUT METHOD | INPUT TIME |
|---|---|
| METHOD OF PRESENT INVENTION | 120 SECONDS (64 CHARACTERS / MINUTE) |
| COMPANY A'S PDA SOFT KEY + CONVERSION | 290 SECONDS (27 CHARACTERS / MINUTE) |
| COMPANY B'S PDA HANDWRITTEN CHARACTER RECOGNITION | 300 SECONDS (26 CHARACTERS / MINUTE) |
| COMPANY C'S PORTABLE PC SOFT KEY + CONVERSION | 260 SECONDS (30 CHARACTERS / MINUTE) |
| COMPANY D'S PORTABLE PC HANDWRITTEN CHARACTER RECOGNITION | 320 SECONDS (24 CHARACTERS / MINUTE) |

FIG.24

TEXT INPUT DEVICE AND METHOD

BACKGROUND OF THE INVENTION

1. Field of the Invention

This invention relates to a computer capable of at least inputting texts, that is, a text input device, and a text input method suitable for efficiently inputting texts in the computer.

2. Description of the Related Art

Recently, improvement in computer performance and miniaturization techniques have allowed various portable computers to be used broadly. Particularly, a so-called pen-input computer without having a hardware keyboard is convenient for portable use and is utilized as a general-purpose computer for an increasing number of occasions.

Most of the currently commercialized pen-input computers employ a handwritten character recognition system or a character input system using a so-called soft keyboard on the screen, as the system for performing text input. The soft keyboard realizes substantially the same function as the hardware keyboard by displaying a keyboard image on the screen in which key images corresponding to "hiragana" or "katakana" characters (both are Japanese characters) and alphabetic characters are arrayed in a predetermined order, and then pointing a key on the displayed keyboard image using a pointing device, for example. With respect to the keyboard image, in the case of hiragana characters, the keys are arrayed in the order of the Japanese syllabary, and in the case of alphabetic characters, the keys are arrayed in the alphabetical order.

However, in the case of the handwritten character recognition, since the character input speed of handwriting is limited and correction of false recognition of a handwritten character by the computer is troublesome, it is essentially difficult to improve the input speed significantly. It is considered that the character input speed of the current pen-input computer capable of handwritten character recognition is approximately 30 characters per minute at most. In addition, in the case of the handwritten character input, the user's hand will be fatigued with input of a large volume of text.

Also, in the character input system using the soft keyboard, "kana-kanji" (Japanese character to Chinese character) conversion is performed with respect to a character inputted by using the soft keyboard. In this system, since characters on the small keyboard (soft keyboard) displayed on the screen must be continuously picked up accurately, the user's eyes and nerves may be fatigued, and the input and conversion are time-consuming.

Thus, in view of the foregoing status of the art, it is an object of the present invention to provide a text input device and method which enable efficient and high-speed input of texts.

SUMMARY OF THE INVENTION

According to the present invention, there is provided a text input device including: display means capable of displaying at least a character; dictionary storage means storing a plurality of words and a plurality of exemplary phrases; input means for performing at least input of a unit character and selective input of a displayed menu item; and retrieval means for retrieving a plurality of words to be displayed as menu items on the basis of the input from the input means and/or an already determined character array; wherein a desired word is selected by the input means from the plurality of words displayed as the menu items so as to perform text input.

According to the present invention, there is also provided a text input method including: a display step of displaying at least a character on a display screen; an input step of performing at least input of a unit character and selective input of a displayed menu item; and a retrieval step of retrieving a plurality of words to be displayed as menu items from a dictionary storing a plurality of words and a plurality of exemplary phrases, on the basis of the input by the input step and/or an already determined character array; wherein a desired word is selected by the input step from the plurality of words displayed as the menu items so as to perform text input.

That is, the present invention provides the text input device and method suitable for a pen-input computer based on retrieval and prediction of characters, words, and sentences, etc. Thus, the present invention enables efficient and high-speed input of texts by repeating the operation of selecting a word from a set of candidate words which are selectively collected by partial designation of reading and prediction from a character array immediately before the input position.

BRIEF DESCRIPTION OF THE DRAWINGS

FIG. 4 illustrates an example of the display screen (pull-down menu) in the case where a retrieval condition (reading) of "i" is designated.

FIG. 5 illustrates an example of the display screen (pop-up menu) in the case where the retrieval condition (reading) of "i" is designated.

FIG. 6 illustrates an example of the display screen (pull-down menu) in the case where a retrieval condition (reading) of "ika" is designated.

FIG. 7 illustrates selection of a candidate word "ikani" from candidate words of the pull-down menu in the case where the retrieval condition (reading) of "ika" is designated.

FIG. 9 illustrates selection of a candidate word "wo" from candidate words of a pop-up menu displayed in the case where a character array of "ikani honshuhou" is determined.

FIG. 10 illustrates selection of a candidate word "mochiita" from candidate words of a pop-up menu displayed in the case where a character array of "ikani honshuhou wo" is determined.

FIG. 15 illustrates a format of word dictionary used in the pen-input computer of the embodiment of the present invention.

FIG. 16 illustrates a format of exemplary phase dictionary used in the pen-input computer of the embodiment of the present invention.

FIG. 24 illustrates measurement results of input time in the case where an exemplary sentence of 128 characters is inputted using the pen-input computer of the embodiment of the present invention and an existing pen-input computer.

DETAILED DESCRIPTION OF THE INVENTION

Preferred embodiments of the present invention will now be described with reference to the drawings.

Figure 1:
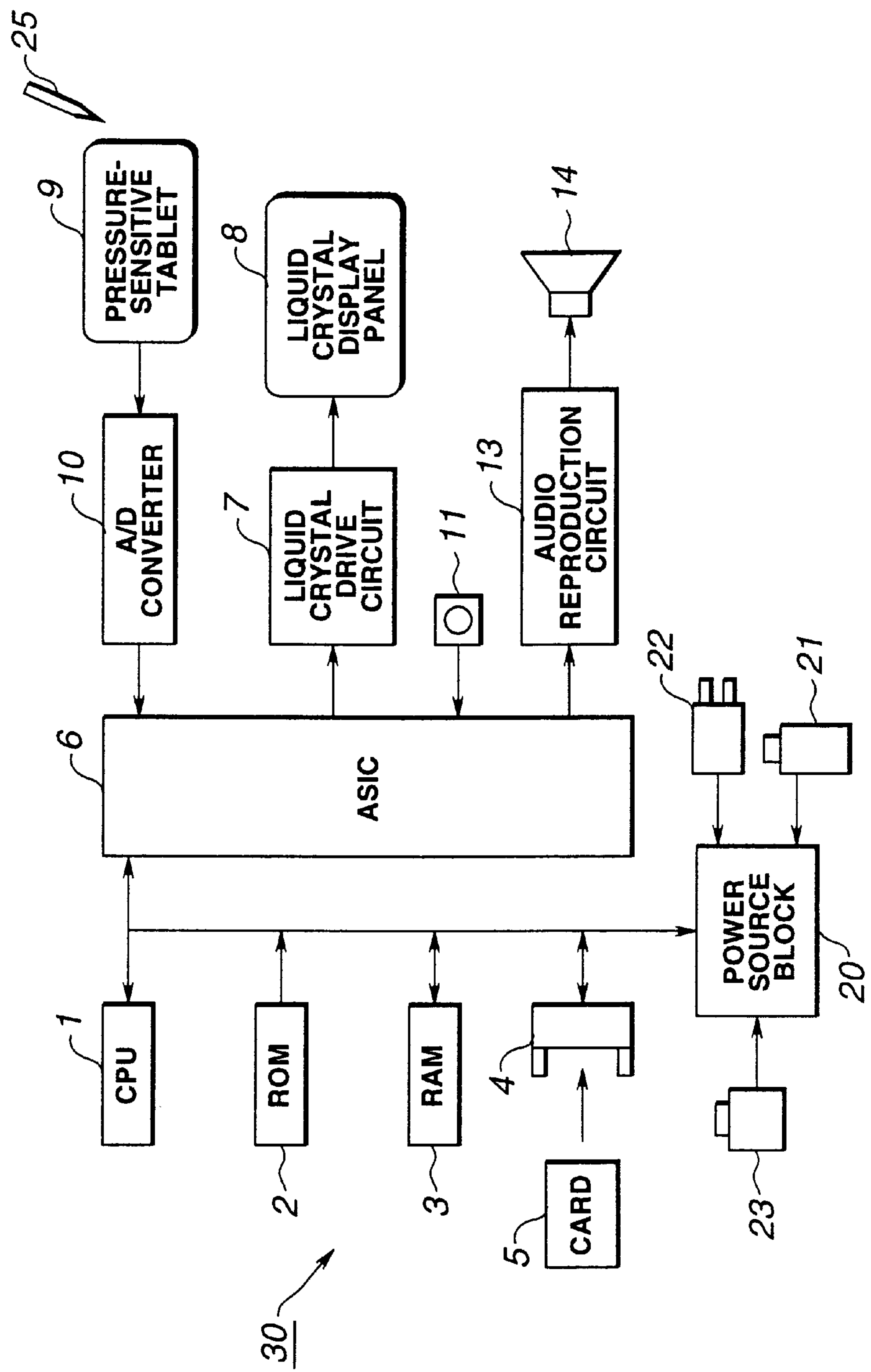
FIG. 1 is a block circuit diagram showing a schematic circuit structure of a pen-input computer of an embodiment of the present invention.

As an embodiment of the text input device and method according to the present invention, the structure of a pen-input computer is shown in FIG. 1.

A pen-input computer 30 of this embodiment shown in FIG. 1 is a portable pen-input computer which includes a small-sized portable casing with a relatively large liquid crystal display panel provided therein, and is thus capable of displaying characters and figures based on data inputted thereto, on the liquid crystal display panel.

The pen-input computer 30 shown in FIG. 1 has a central processing unit (CPU) 1 for controlling the entire constituent elements therein. The CPU 1 is connected with a read-only memory (ROM) 2 storing therein a basic program referred to as a so-called operating system (OS), a text input program for realizing pen input, as later described, a word dictionary and an exemplary phase dictionary. The CPU 1 is also connected with a RAM 3 adapted for temporarily storing input data and provided as various buffer memories as later described. The CPU 1 is also connected with a card slot 4 to which a memory card 5 as external storage means may be connected. The CPU 1 performs processing of data stored in the RAM 3 in accordance with the basic program stored in the ROM 2. In addition, the CPU 1 reads and transfers data from the memory card 5 connected to the card slot 4 to the RAM 3, or transfers the data stored in the RAM 3 to the memory card 5, in accordance with the basic program. Thus, the storage area of the RAM 3 is also used as a work area for the data to be processed in accordance with the basic program. In order to enable version up in the pen-input computer 30, it is desired that the ROM 2 is a static rewritable memory, such as, a flash memory.

The CPU 1 is also connected with a liquid crystal drive circuit 7 via a so-called application specific integrated circuit (ASIC) 6 as an interface. The CPU 1 performs display control of a liquid crystal display panel 8 connected to the liquid crystal drive circuit 7.

On the surface of the liquid crystal display panel 8, a pressure-sensitive tablet 9 is provided. When the surface of the pressure-sensitive tablet 9 is touched by an input pen 25 or the like, the pressure-sensitive tablet 9 generates a coordinate position signal indicating the coordinate of a position touched by the input pen 25. The coordinate position signal generated by the pressure-sensitive tablet 9 is converted to digital data (coordinate position data) by an analog/digital converter 10, and is sent to the CPU 1 via the ASIC 6. On the basis of the coordinate position on the liquid crystal display panel 8 of the contents actually displayed on the liquid crystal display panel 8 and the coordinate position data inputted from the pressure-sensitive tablet 9, the CPU 1 judges what information is inputted from the input pen 25.

The pen-input computer 30 also has an audio reproduction circuit 13 and a speaker 14 to which an output of the audio reproduction circuit 13 is supplied. Under the control of the CPU 1, as audio data stored in the ROM 2 or the RAM 3 is supplied to the audio reproduction circuit 13, the audio data is outputted as sounds from the speaker 14.

In addition, the pen-input computer 30 has a power button 11 indicating ON/OFF of a power source. When power ON operation is performed at power button 11, the power obtained from a main battery 21 or an AC adaptor 22 is supplied to each constituent element via a power source block 20 as a power circuit. The pen-input computer 30 also has a back-up battery 23 for the RAM 3. When the power cannot be obtained from the main battery 21 or the AC adaptor 22, the back-up battery 23 backs up the RAM 3 so as to prevent erasure of the data stored in the RAM 3.

Figure 2:
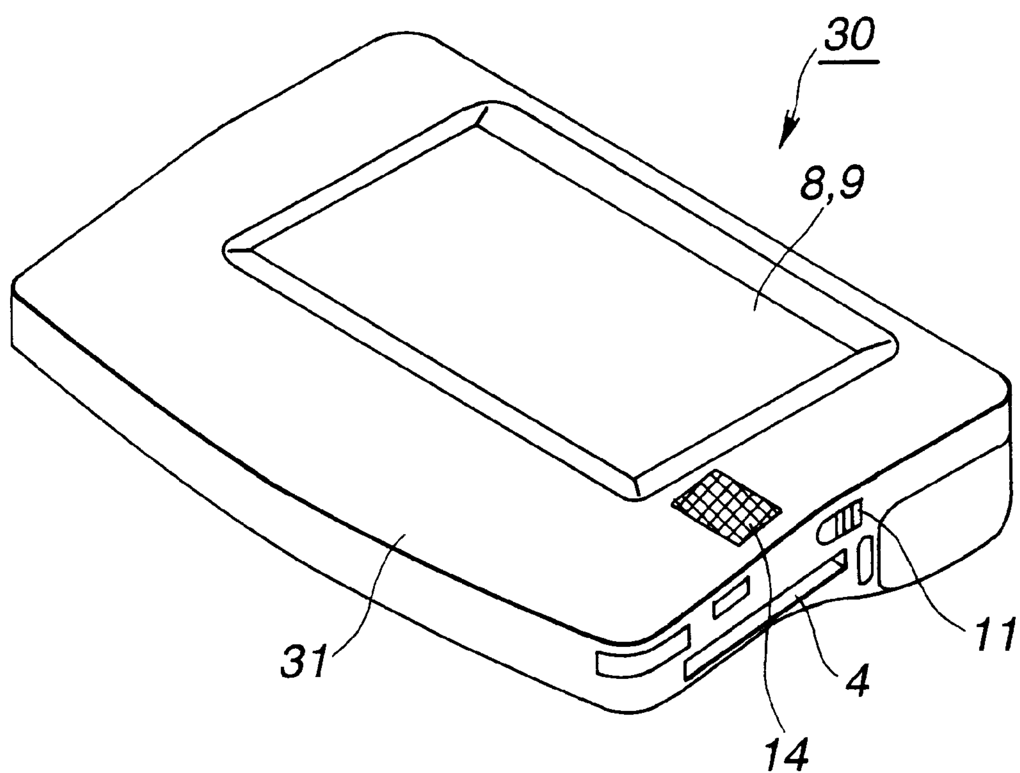
FIG. 2 is a perspective view showing the pen-input computer of the embodiment of the present invention, obliquely viewed from above.

FIG. 2 shows schematic appearance of the pen-input computer 30 of the present embodiment.

In FIG. 2, the pen-input computer 30 of the present embodiment has the circuit portion of FIG. 1 provided within a casing 31. On the top side of the casing 31, the speaker 14 and the liquid crystal display panel 8 having the pressure-sensitive tablet 9 on the surface thereof are arranged. The liquid crystal display panel 8 is located substantially at the center on the top side of the casing 31. By touching the pressure-sensitive tablet 9 provided on the liquid crystal display panel 8 using the input pen 25, for example, input by the pen is enabled. On the right lateral side of the casing 31, for example, the power button 11 and the card slot 4 are arranged.

The basic idea in the case where the text input method of the present invention is applied to the pen-input computer of the present embodiment having the above-described structure will now be explained.

In the text input method of the existing pen-input computer, it is normal that the user provides a large amount of information relating to an input character array. Specifically, as described above, in the pen-input computer employing the handwritten character recognition system, input of a character is regarded as being done only when the user writes the character correctly. In the pen-input computer employing the soft keyboard and kana-kanji conversion system, kana-kanji conversion is performed only when complete reading of a character array is inputted from the soft keyboard.

On the contrary, by picking up a plurality of candidate characters, words and phrases (hereinafter collectively referred to as words) as retrieval conditions with respect to partial information about a character array to be inputted, such as, a leading character of the character array to be inputted or several characters included in the character array, then selecting necessary words from these candidates and connecting the obtained words, text input is enabled without providing complete information about the character array to be inputted.

That is, particularly in the pen-input computer, the selecting operation may be performed at a high speed though the character input operation cannot be performed as speedily as the computer having the hardware keyboard. Therefore, it is considered that high-speed character input may be performed in the pen-input computer by employing at least the following four policies different from those of the computer having the hardware keyboard.

A first policy is to provide retrieval conditions by a simple operation.

A second policy is to dynamically change a set of candidate words in accordance with a change in the retrieval conditions so as to retrieve and display the candidate words, and use these candidate words as selection objects.

A third policy is to select a target word from the plural candidates displayed as retrieval results.

A fourth policy is to calculate the likelihood of appearance of words from a determined character array immediately before the input position of the word or the general appearance frequency of the word and the context, and display the candidates in the order of likelihood of appearance.

In order to realize these four policies, specifically, the following method is employed.

In the designation of retrieval conditions, a part of reading of the input character array is designated as a retrieval condition using the soft keyboard displayed on the screen. That is, the retrieval condition for retrieving a word to be inputted is designated by selecting a key corresponding a leading one character of the word to be inputted or keys corresponding to several characters from the leading character or several characters intermittent from the leading character, instead of the entire reading of the word, from the keys on the soft keyboard using the input pen. As the method for designating the retrieval condition, it is also possible to designate plural characters indicating the reading by a single operation.

In the retrieval and display of candidate words and selection thereof, at the moment when a part of reading of the input character array is designated, a set of candidate words starting with that reading is presented as selection objects. That is, when the retrieval condition (the above-mentioned reading) for retrieving the word to be inputted is designated, plural words corresponding to the retrieval condition (reading) are displayed as candidates. However, if the designation of retrieval condition is altered, the display of candidate words is immediately changed. In addition, in the retrieval of candidate words, a prepared exemplary phase is used to predict the input word from the character array already determined immediately before the word input position and present this predicted word preferentially. For example, when reading of "o" is designated by the input pen in the case where the character array already determined immediately before the word input position ends with "yoroshiku", a word "onegai" is preferentially presented as a candidate. In this retrieval of candidate words, when there is no exemplary phrase matched with the retrieval condition (reading), a word of a high use frequency or a word matched with the reading among the recently selected words is preferentially presented as a candidate word. When there is no word matched with the retrieval condition, fuzzy retrieval as later described is performed so that a word proximate to the retrieval condition is presented as a candidate. The plural candidate words thus obtained become selection objects in selecting the word to be inputted. The set of candidate words in this case is displayed as a menu at a position near the soft keys or at a predetermined position.

On the basis of the above-described four policies and specific methods thereof, text input in the pen-input computer 30 of FIG. 1 is hereinafter described in detail with reference to FIGS. 3 to 14.

A specific example of the case where a Japanese sentence of "ikani honshuhou wo mochiita . . . " is inputted is described with reference to FIGS. 3 to 10. In FIGS. 3 to 14, the position of the input pen is indicated by an arrow A.

Figure 3:
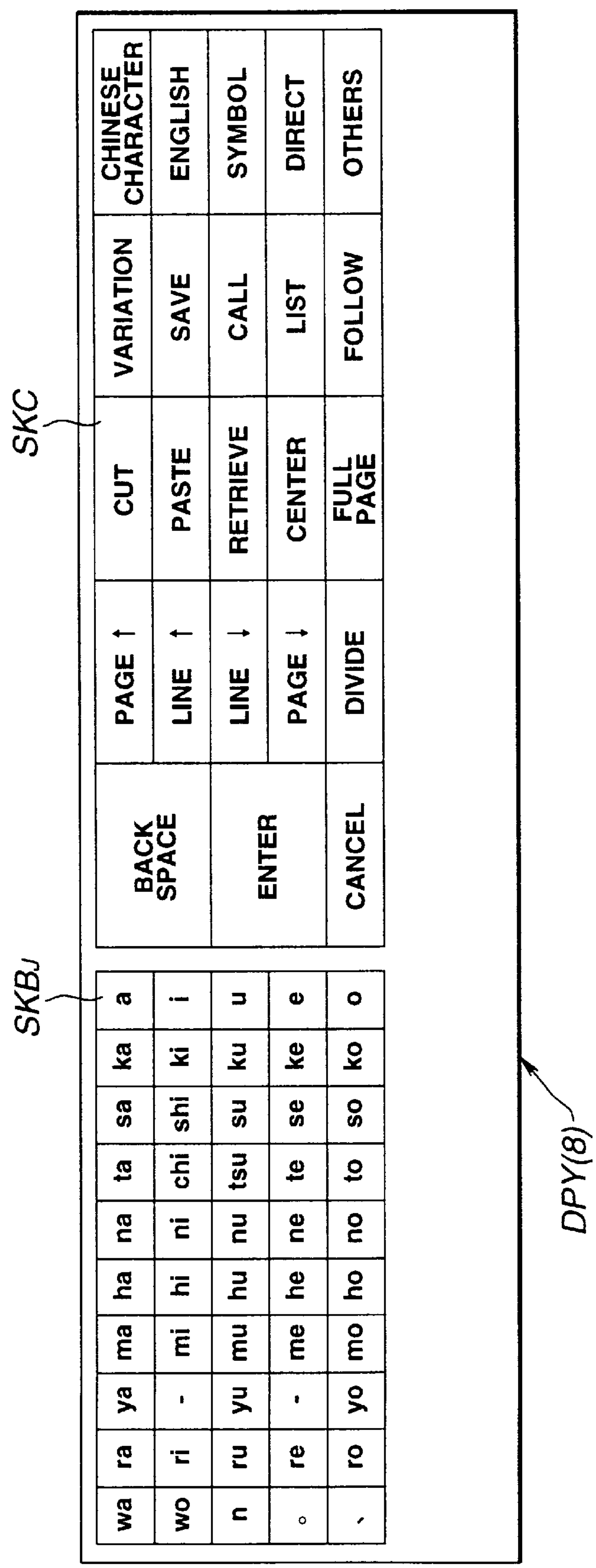
FIG. 3 illustrates an example of an initial display screen of a liquid crystal display panel at the time of Japanese input in the embodiment of the present invention.

FIG. 3 shows an initial screen of a Japanese soft keyboard SKBJ in the order of the Japanese syllabary displayed on a screen DPY of the liquid crystal display panel 8 of FIGS. 1 and 2. In the soft keyboard SKBJ, hiragana soft keys in the order of the Japanese syllabary composed of unit characters "a" to "n" (including punctuation marks " " and " ") and general edit command soft keys SKC including "Back Space", "Enter" and "Cancel" are provided. The hiragana soft keys are arrayed substantially in the order of the Japanese syllabary.

In this state of the initial screen, as shown in FIG. 4, when a soft key skI of "i" is pressed by the input pen (arrow A), this "i" is designated as a retrieval condition (reading). When "i" is thus designated as a retrieval condition, a set of plural candidate words starting with "i" are displayed as a pull-down menu PDMJ on the screen DPY, as shown in FIG. 4. The pull-down menu is generally a menu display system for displaying a list of selectable work items on the screen in designating a work to the computer and allowing the user to select a target work from the list. In this system, the menu of work items appears on the screen as if a scroll were pulled out. In the present embodiment, the candidate words are displayed in the pull-down menu in place of the work items.

As the pull-down menu PDMJ of FIG. 4, among words starting with "i", approximately 10 candidate words from the word of the highest appearance frequency (for example, "i", "ima", "intahuesu", "iru", "ika", "ita", "ii", "iu", "itsu", "idou", "inai", "imasu", etc.) are displayed as menu items. In the following description, each menu item of each displayed candidate word is referred to as a menu key. As a matter of course, the number of candidate words displayed as the pull-down menu PDMJ is not limited to approximately 10 and may be smaller or greater. The number of displayed candidate words is determined in consideration of the size of the screen DPY and the proportion to other display contents. When the pull-down menu PDMJ is displayed, the display of the soft keyboard SKBJ is disturbed. Therefore, it is also possible to perform menu display of the same contents as the pull-down menu PDMJ in a place other than the display area of the soft keyboard SKBJ (preferably, at a position not disturbing other display contents).

In the state of the display of FIG. 4, if the input pen is released, the candidate words which have been displayed in the pull-down menu PDMJ of FIG. 4 are now displayed as a pop-up menu PUMJ at a lower part of the screen DPY, as shown in FIG. 5, and the display of the pull-down menu PDMJ of FIG. 4 is extinguished. The pop-up menu is a menu display system of the same type as the pull-down menu and is adapted for displaying a menu at an arbitrary position on the screen. In the present embodiment, the pop-up menu is displayed at the lower part of the screen DPY as shown in FIG. 5. However, it may be displayed at other positions and preferably at a position not disturbing other display contents.

In this pop-up menu PUMJ of FIG. 5, too, candidate words are arrayed sequentially from a word of the highest appearance frequency. Since the pop-up menu PUMJ in this case is displayed outside of the soft keyboard SKBJ, the number of displayed candidate words may be greater than in the case of the pull-down menu PDMJ of FIG. 2. In the case of FIG. 5, candidate words of "i", "ima", "intahuesu", "iru", "ika", "ita", "ii", "iu", "itsu", "imasu", "idou", "inai", "identeki", "ichi", "iki", "itsumo", "izen", "imi", etc. are displayed.

In the state of the display of FIG. 5, if a menu key corresponding to a desired candidate word on the pop-up menu PUMJ is touched with the pen, the candidate word corresponding to the menu key is selected. Thus, the selected candidate word may be inputted. After the candidate word is selected, the display of the pop-up menu PUMJ is extinguished.

In addition, when the pen is released in the state of the display of FIG. 4, it is also possible to maintain the display of the pull-down menu PDMJ of FIG. 4 and select the desired candidate word from the pull-down menu PDMJ, instead of displaying the pop-up menu PUMJ of FIG. 5.

On the other hand, if "i" is first designated as a retrieval condition as shown in FIG. 4 and the input pen (arrow A) is moved in contact with the screen DPY onto a soft key skK of "ka" as shown in FIG. 6, "ika" is designated as a retrieval condition. This designation of plural characters by moving the input pen in contact with the screen DPY is referred to as drag processing. When the reading of "ika" is thus designated as a retrieval condition by the drag processing, a set of candidate words starting with "ika" are displayed as a pull-down menu PDMJ on the screen DPY, as shown in FIG. 6.

As the pull-down menu PDMJ of FIG. 6, among words starting with "ika", plural candidate words (for example, "ika", "ito", "ikari", "igai", "ikani", "iga" "ikaga", "ikanimo", "igai", "ikasu", "ikan", "ikahonbun", etc) are displayed sequentially from the word of the highest appearance frequency. Thus, in the embodiment of the present invention, when the input pen is moved onto another character (another soft key) while being in contact with the screen DPY, the retrieval condition and the candidate words are dynamically changed.

In the case of the display of FIG. 6, similar to the above-described case, the pull-down menu PDMJ may be displayed at a position other than the display area of the soft keyboard SKBJ (preferably at a position not disturbing other display contents).

By releasing the pen in the state of the display of FIG. 6 and selecting a menu key corresponding to a desired candidate word from the pull-down menu PDMJ as shown in FIG. 7, input of the selected candidate word is performed. In the case of FIG. 7, a menu key mkI displayed as "ikani" is selected from the pull-down menu PDMJ by the input pen (arrow A).

When the pen is released in the state of the display of FIG. 6, the candidate words which have been displayed in the pull-down menu PDMJ of FIG. 6 may be displayed as the pop-up menu PUMJ at the lower part of the screen DPY as shown in FIG. 5.

By procedures similar to those described above, when the drag processing is performed to designate a soft key skN of "n" without releasing the input pen from the screen DPY after a soft key of "ho" is pressed with the pen, "hon" is designated as a retrieval condition. As the reading of "hon" is thus designated as a retrieval condition, a set of candidate words starting with "hon" is displayed as a pull-down menu PDMJ on the screen DPY, as shown in FIG. 8.

Figure 8:
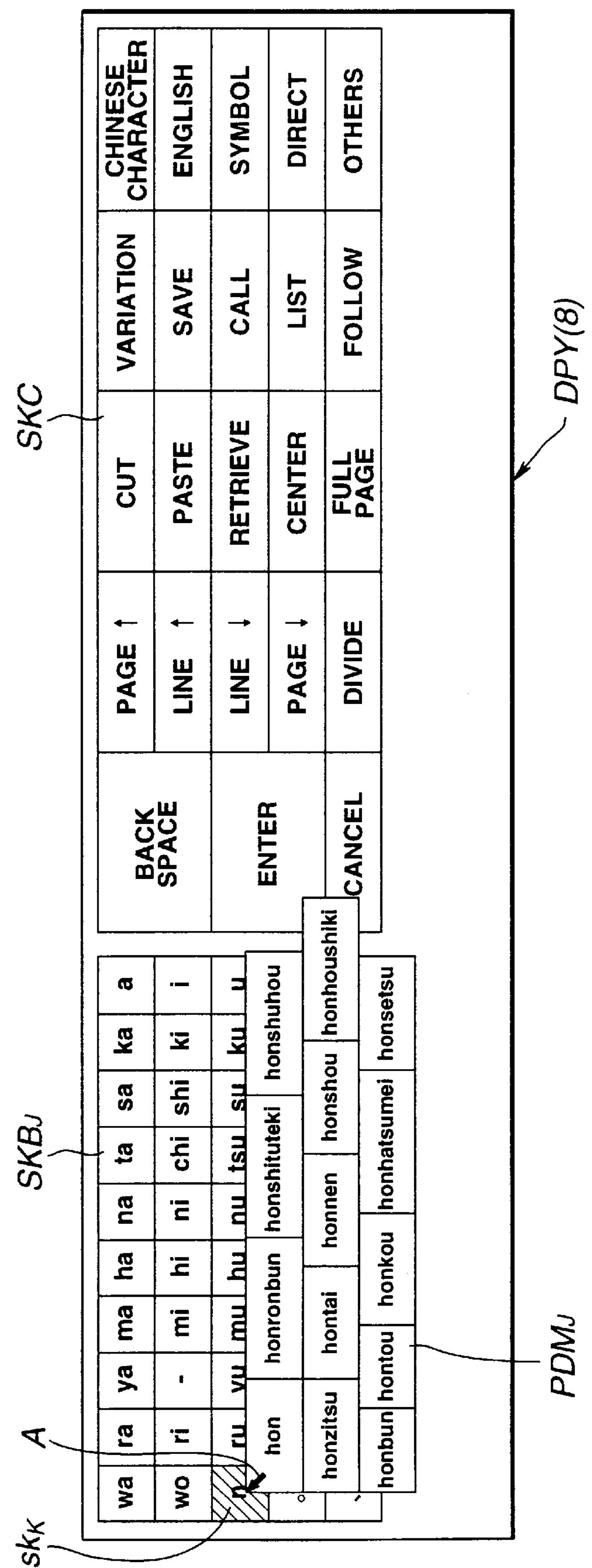
FIG. 8 illustrates an example of the display screen (pull-down menu) in the case where a retrieval condition (reading) of "hon" is designated.

As the pull-down menu PDMJ of FIG. 8, among words starting with "hon", candidate words (for example, "hon", "honzitsu", "honbun", "honronbun", "hontai", "hontou", "honshitsuteki ", "honnen", "honkou", "honshou", "honhatsumei", "honshuhou", "honhoushiki", "honsetsu", etc.) are displayed sequentially from the word of the highest appearance frequency. In the present embodiment, for example, a menu key displayed as "honshuhou" is selected from the pull-down menu PDMJ by the pen.

By the foregoing procedures, the character array determined at this point is "ikani honshuhou". The character array thus determined is displayed at a position on the screen where the soft keyboard, the edit command soft keys, the pull-down menu and the pop-up menu are not displayed.

Next, on the screen DPY, a set of candidate words in the order from a word which most frequently appears immediately after the determined character array of "ikani honshuhou" is displayed as a pop-up menu PUMJ, as shown in FIG. 9. The set of candidate words which frequently appear immediately after the determined character array of "ikani honshuhou" includes "wa", "wo", "wo bunshohenshu", "wa tanjun", "no", "ga", "wo mochiite", "to", "wo tekiyou", "ni", "no kirikae", "niyori", "wo teian", "wo tsukau", "nituite", "no yugou", "de", etc. These candidate words are displayed as the pop-up menu PUMJ of FIG. 9. In the present embodiment, as a menu key mkO displayed as "wo" is selected by the pen (arrow A) from the pop-up menu PUMJ in the state of the display of FIG. 9, the determined character array becomes "ikani honshuhou wo".

As shown in FIG. 9, "wo", "wa" and the like on the pop-up menu PUMJ are candidate words which frequently appear immediately after the determined character array of "ikani honshuhou". Each candidate word displayed at this point is displayed as the pop-up menu PUMJ even though the user does not designate the retrieval condition as the reading by the soft keyboard SKBJ. Each candidate word may be directly selected from the candidate words displayed on the pop-up menu PUMJ by using the input pen 25.

Next, on the screen DPY, a set of candidate words in the order from a word which most frequently appears immediately after the determined character array of "ikani honshuhou wo" is displayed as a pop-up menu PUMJ, as shown in FIG. 10. The set of candidate words at this point includes "bunshohenshu", "mochiite", "tekiyou", "teian", "tsukau", "heiyou", "sentaku", "sentakushi", "mochii", "shiyoushi", "tsukawa", "mochiita", "okona", "nyuryoku", "yosoku", "sakusei", "okonau", "zikkou", etc. These candidate words are displayed as the pop-up menu PUMJ of FIG. 10. In the present embodiment, as a menu key mkM displayed as "mochiita" is selected by the pen (arrow A) from the pop-up menu PUMJ in the state of the display of FIG. 10, the determined character array becomes "ikani honshuhou wo mochiita".

In the case of FIG. 10, too, the candidate words which frequently appear immediately after the determined character array "ikani honshuhou wo" are displayed as the pop-up menu PUMJ even though the user does not designate the retrieval condition as the reading by the soft keyboard SKBJ. Therefore, each candidate word may be directly selected from the candidate words displayed on the pop-up menu PUMJ by using the pen.

By the above-described procedures, the character array of "ikani honshuhou wo mochiita" may be determined.

In the text input procedures according to the present invention up to this point, it can be seen that the character array of "ikani honshuhou wo mochiita" is inputted by six operations, on the assumption that one operation includes the operation of touching the screen DPY with the pen and releasing the pen.

On the contrary, in the case where the character array of "ikani honshuhou wo mochiita" is to be inputted by using the existing pen-input computer employing the handwritten character recognition system, the total of about 40 operations are required. In the case of the pen-input computer employing the soft keyboard and the kana-kanji conversion system, at least about 20 operations are required. In the case where the character array of "ikani honshuhou wo mochiita" is to be inputted by using the conventional pen-input computer employing the soft keyboard and the kana-kanji conversion system, soft keys of "i" and "ka" are first designated and then a soft command key "Convert" for kana-kanji conversion is designated to determine the character array "ika" (i.e., three operations). Next, a soft key of "ni" is designated and then a soft command key "Determine" is designated to determine the character "ni" (i.e., two operations). Next, soft keys of "ho" and "n" are designated and then the soft command key "Convert" is designated to determine the character "hon" (i.e., three operations). Subsequently, soft keys of "shi" and "yu" are designated and a soft command key "Character Convert" for converting the character "yu" into a small letter is designated (i.e., three operations). Next, soft keys of "ho" and "u" are designated and then the soft command key "Convert" is designated to determine the character array "shuhou" (i.e., three operations). Then, a soft key of "wo" is designated and then the soft command key "Determine" is designated to determine the character "wo" (i.e., two operations). Finally, soft keys of "mo", "chi", "i" and "ta" are sequentially designated and then the soft command key "Convert" is designated (i.e., five operations). Thus, input of the character array of "ikani honshuhou wo mochiita" is determined. In this manner, with the conventional pen-input computer employing the soft keyboard and the kana-kanji conversion system, the total of 21 operations (=3+2+3+3+3+2+5) are required for inputting the character array of "ikani honshuhou wo mochiita".

FIGS. 3 to 10 show the operations and exemplary displays in the case of Japanese input. However, in the case of English input, operations and displays as shown in FIGS. 11 to 14 are carried out. The reference numerals in FIGS. 11 to 14 correspond to those in FIGS. 3 to 10.

Figure 11:
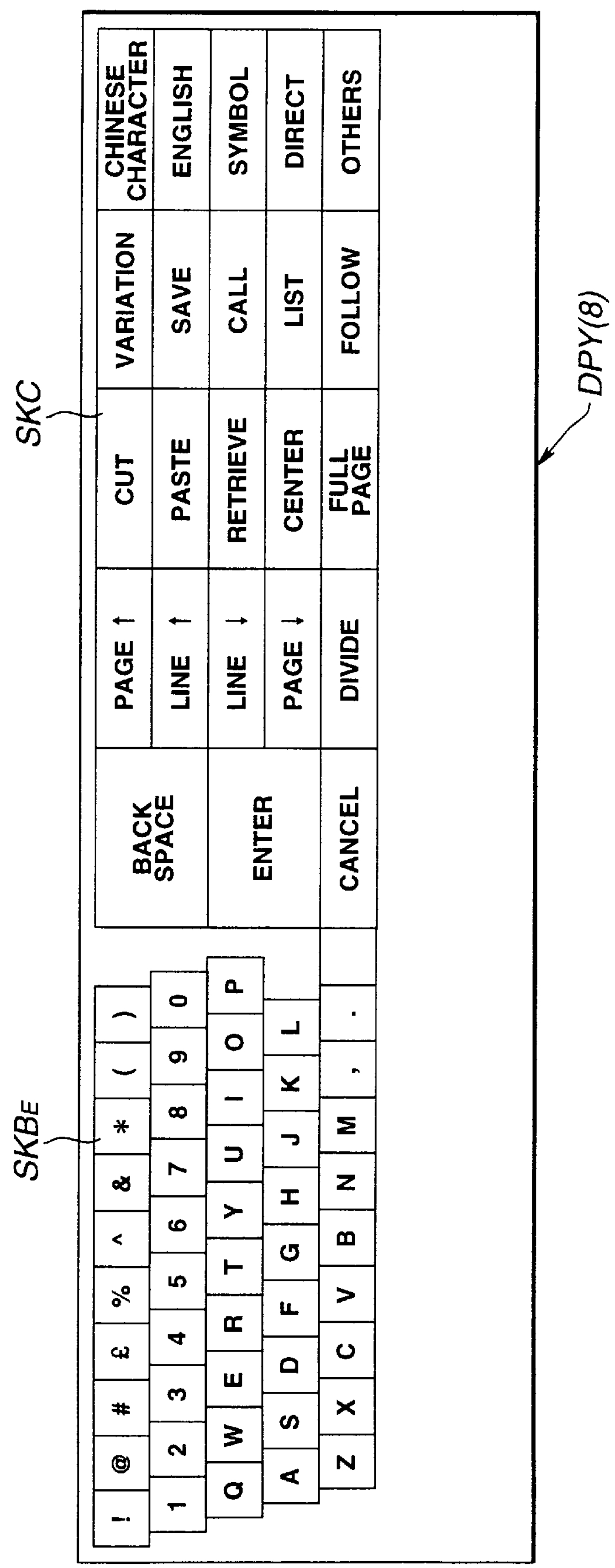
FIG. 11 illustrates an example of an initial display screen of the liquid crystal display panel in English input in the embodiment of the present invention.

FIG. 11 shows an initial screen of a soft keyboard SKBE composed of unit characters including alphabetic characters and numeric characters displayed on the screen DPY Of the liquid crystal display panel 8. In the soft keyboard SKBE, alphabetical soft keys of "A" to "Z" (including symbolic characters "(",") ", "#", etc.) and general edit command soft keys SKC including "Back Space", "Enter" and "Cancel" are provided. The edit command soft keys SKC may be displayed also in Japanese or other languages.

Figure 12:
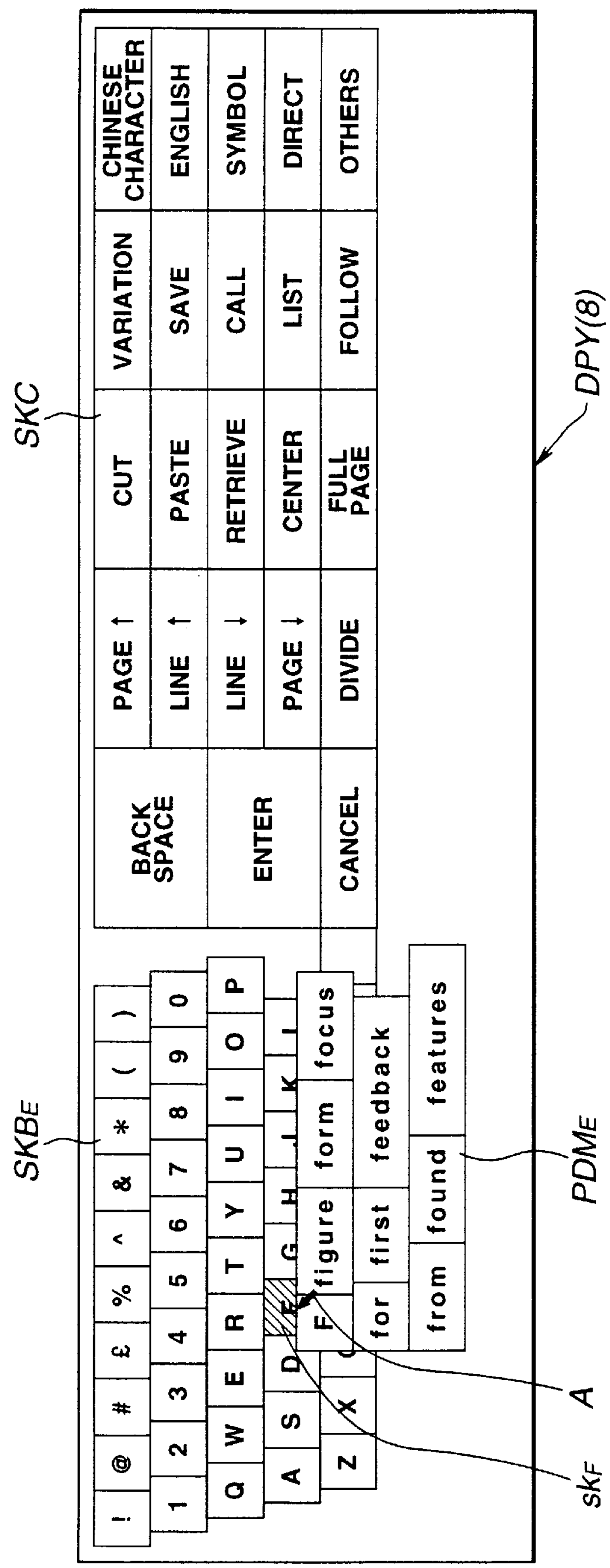
FIG. 12 illustrates an example of the display screen (pull-down menu) in the case where a retrieval condition (reading ) of "F" is designated.

In this state of the initial screen, as shown in FIG. 12, if a soft key skF of "F", for example, is pressed by the input pen (arrow A), "F" is designated as a retrieval condition (reading). When "F" is thus designated as a retrieval condition, a set of plural candidate words starting with "F" is displayed as a pull-down menu PDME on the screen DPY, as shown in FIG. 12.

Figure 13:
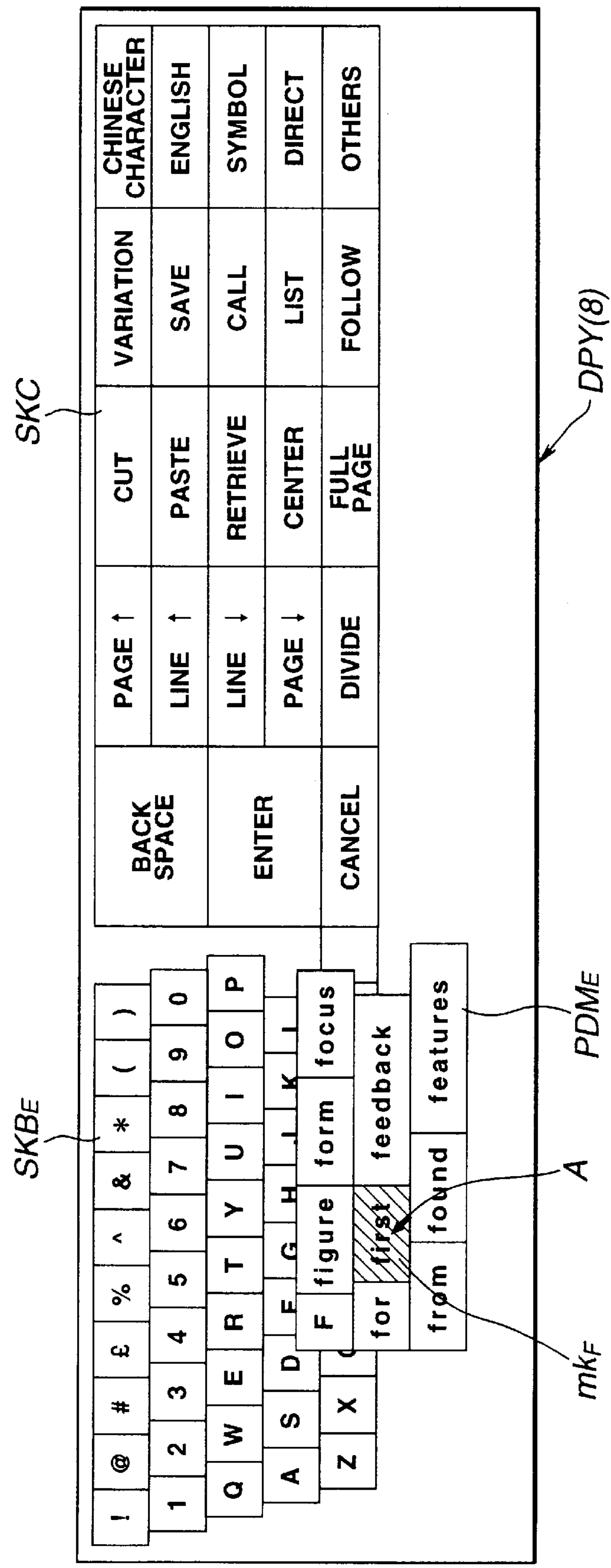
FIG. 13 illustrates selection of a candidate word "first" from candidate words of the pull-down menu in the case where the retrieval condition (reading) of "F" is designated.

As the pull-down menu PDME of FIG. 12, among words starting with "F", approximately 10 candidate words from the word of the highest appearance frequency (for example, "F", "for", "from", "figure", "first", "found", "form", "focus", "feedback", "features", etc.) are displayed as menu items (menu keys). In the state of the display of FIG. 12, a desired candidate word is selected from the candidate words displayed as the pull-down menu PDME. For example, if a menu key mkf of "first" is selected, the character "first" is determined, as shown in FIG. 13.

Figure 14:
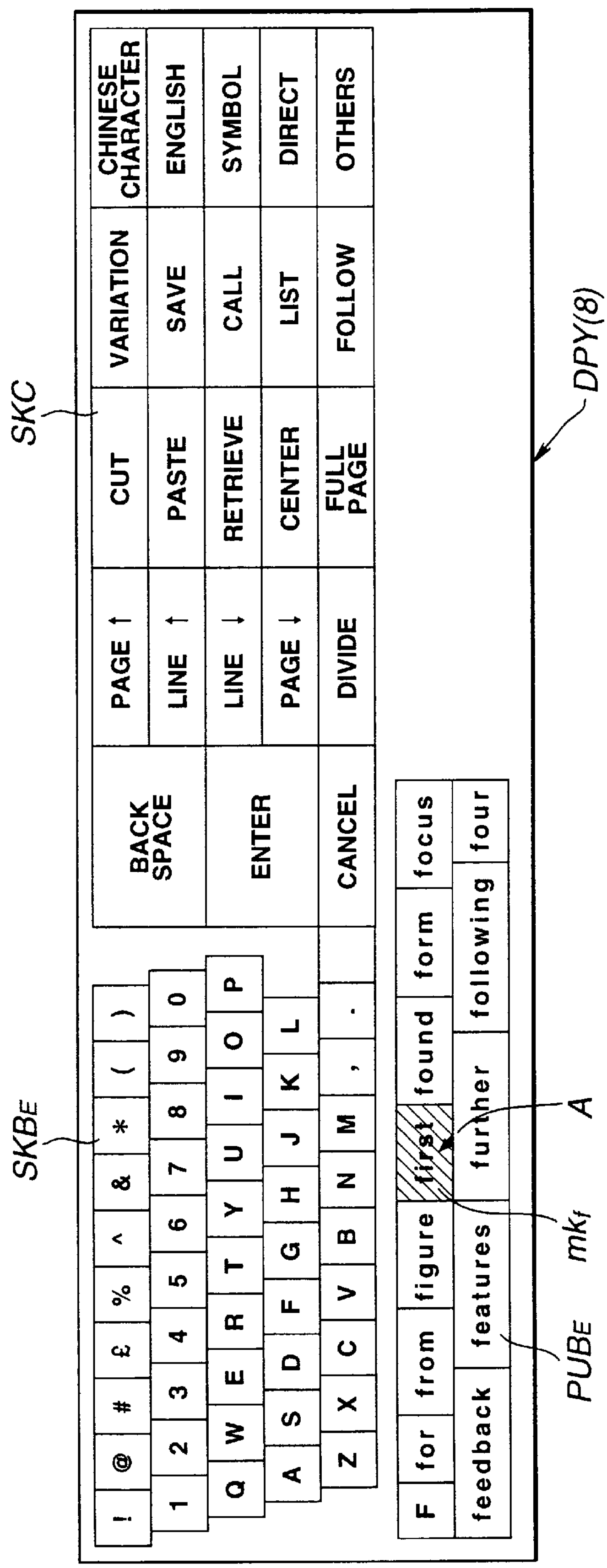
FIG. 14 illustrates selection of a candidate word "first" from candidate words of a pop-up menu in the case where the retrieval condition (reading) of "F" is designated.

In the state of the display of FIG. 12, by releasing the input pen, the candidate words which have been displayed in the pull-down menu PDME of FIG. 12 may be displayed as a pop-up menu PUME at a lower part of the screen DPY, as shown in FIG. 14. In this pop-up menu PUME of FIG. 14, too, candidate words are arrayed sequentially from a word of the highest appearance frequency. In the pop-up menu PUME in FIG. 14, for example, candidate words of "F", "for", "from", "figure", "first", "found", "form", "focus", "feedback", "features", "further", "following", "four", etc. are displayed. In the state of the display of FIG. 14, a desired candidate word is selected from the candidate words displayed in the pop-up menu PUME. In the case of FIG. 14, a menu key mkf of "first" is selected.

In the above-described English input, similar to the previous case of Japanese input, English text input may be carried out by simple selection operations.

Thus, the text input method according to the present invention is not only effective for the input accompanying conversion operations (such as, hiragana-kanji conversion and alphabetic character to hiragana and kanji conversion) as in Japanese input, but also applicable to text input in a language not requiring conversion operations, such as, English, French or German. Particularly, in the text input method of the present invention, since an English word or the like is inputted by selecting the word from the plural candidate words as described above, it is anticipated that the spell check operation which is necessary for ordinary English text input becomes substantially unnecessary.

In the case where the determined text is to be corrected or erased, the edit command soft keys SKC are used.

Meanwhile, in order to effectively realize the text input method of the embodiment as described above, a word dictionary and an exemplary phrase dictionary of high quality are required.

For example, as the word dictionary used in the embodiment of the Japanese input, a format of word dictionary as shown in FIG. 15 may be considered. The word dictionary of the format shown in FIG. 15 has a list structure which includes reading (reading of a candidate word) as a first element on the left side in FIG. 15 and the candidate word as a second element on the right side in FIG. 15.

As the exemplary phrase dictionary for the Japanese input used in the embodiment, a format of exemplary phrase dictionary as shown in FIG. 16 may be considered. The exemplary phrase dictionary of the format shown in FIG. 16 has a list structure which includes a first element indicating a determined character array as a retrieval condition on the left side in FIG. 16, the reading of a candidate word as a second element at the center of FIG. 16, and the candidate word as a third element on the right side in FIG. 16. Specifically, in the exemplary phrase dictionary shown in FIG. 16, in the case where the character array of the second element is matched with the character array immediately before the input position, the character array of the third element shown on the right side in FIG. 16 is determined as the candidate word when the retrieval condition (reading) of the first element shown on the left side of FIG. 16 is designated.

In the present embodiment, when retrieval of a candidate word is performed in response to the retrieval condition, the above-described retrieval policies may be realized simply by carrying out matching operation from the leading part of the dictionaries shown in FIGS. 15 and 16.

These dictionaries of FIGS. 15 and 16 have such structures as to allow easy retrieval of a text produced before. That is, since words and exemplary phrases selected at the time of producing a text are added to the leading parts of these dictionaries, the words and exemplary phrases added to the leading parts are preferentially displayed as candidates in the next retrieval. For example, it is easy to input a text similar to the text which is inputted immediately before.

In the case where 10 candidate words, for example, are to be displayed in the pull-down menu or pop-up menu using a word dictionary containing 22000 words, for example, 471 candidate words may be selected by selection of the reading of the first one character and selection of a menu key, and 8611 candidate words may be selected by selection of the reading of the first two characters and selection of menu keys. In the case where 10 candidate words are to be displayed in the pull-down menu or pop-up menu, the probability that a candidate word to be selected in the exemplary phrase among the 471 candidate words will appear on the pull-down menu or pop-up menu by performing selection of the reading of the first one character and selection of the menu key is 44%, and the probability that the candidate word to be selected in the exemplary phrase among the 8611 candidate words will appear on the pull-down menu or pop-up menu by performing selection of the reading of the first two characters and selection of the menu keys is 85%. In addition, by performing selection of the reading of the first three characters and selection of the menu keys, the probability that the candidate word to be selected in the exemplary phrase will appear on the menu is increased to 97% or higher. Thus, with the retrieval processing of the candidate word in the text input method of the present embodiment, almost all candidate words required at the time of text input may be selected, simply by designating the reading of one or two characters.

However, these probabilities of appearance frequency are calculated on the assumption that predicted candidate retrieval for predicting a candidate word of the highest appearance frequency from the determined character array as described with reference to FIGS. 9 and 10 is not used. Actually, as the predicted candidate retrieval functions, the appearance frequency of the required candidate word is increased further, and in a greater number of cases, the word may be inputted without designating the reading as the retrieval condition as in the case of FIGS. 9 and 10.

In addition, in the present embodiment, different dictionaries may be used in accordance with the type and context of the text to be produced, thus enabling more effective text input. For example, input of addresses in producing a name list database is facilitated by using, as a dictionary, a place name list containing the names of places as candidate words. Also, exemplary phrases in producing a letter may be easily retrieved by using an exemplary phrase dictionary containing a set of exemplary phrases as candidate words. In the case of the dictionary of place name list, the names of places as candidate words may be easily retrieved and designated by forming a hierarchical structure in the order of, for example, prefecture, county, city, town, village, and street number.

In the above description, the dictionaries for the Japanese input are explained. However, similar effects may be obtained in the case of the English input. As a matter of course, the similar effect may be obtained not only in the case of the Japanese input using the above-described soft keyboard of Japanese hiragana characters, but also in the case of the Japanese input based on so-called Roman character input using the soft keyboard of alphabetic characters.

In the above-described Japanese input and English input, the fuzzy retrieval is not performed. However, if there are few or no candidate words starting with the reading designated as a retrieval condition, the pen-input computer of the present embodiment performs the fuzzy retrieval. Specifically, in the Japanese input, if the reading of "teke", for example, is designated as a retrieval condition, since there are few words starting with "teke", fuzzy retrieval using "te" and "ke" as retrieval conditions is performed. This fuzzy retrieval enables display of a word "densouken" or the like as a candidate word. In the English input, for example, a word "pithecanthropus" may be inputted simply by designating "p", "t", "p" and "s".

Using an example of the English input, retrieval of a correct candidate word by the fuzzy retrieval will now be described.

Figure 17:
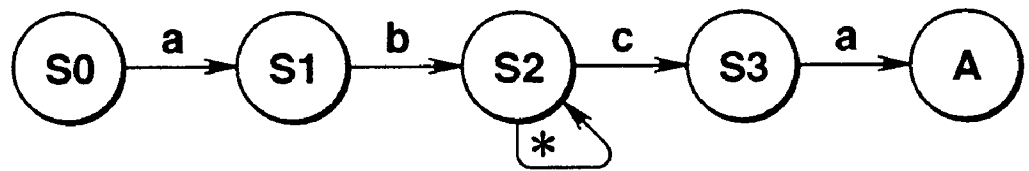
FIG. 17 illustrates a basic structure of a state transition machine used for explaining fuzzy retrieval.

In the text input method of the present embodiment, two types of regular expression recognition algorithms are used together in the word dictionary in order to perform fuzzy retrieval at a high speed. For example, when a character array of "ab ca" ("ab.*cd" in regular expression) is to be retrieved, a state transition machine for recognizing this character array pattern of "ab ca" may be expressed as shown in FIG. 17. The symbol "*" may indicate any input character. In the state transition machine of FIG. 17, an initial state S0 is shifted to a next state S1 by an input character "a", and the state S1 is shifted to a state S2 by an input character "b". The state S2 is not shifted by an input character "*" but is shifted to a state S3 by an input character "c", and the state S3 is shifted to a state A by an input character "a". This state A is referred to as a final state or acceptance state, which indicates whether the input character array "ab ca" has been accepted or not. When the input characters "a", "b", "*", "c" and "a" are not provided, the states S0, S1, S2, S3 and A are extinguished.

Figure 18:
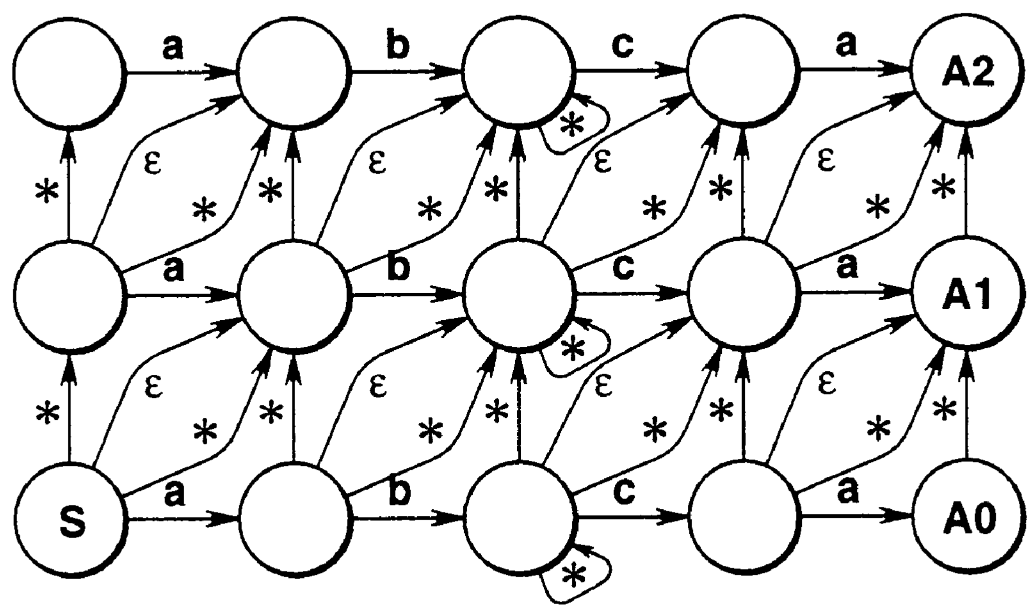
FIG. 18 illustrates an extended structure of the state transition machine used for explaining fuzzy retrieval.

The state transition machine expressed as in FIG. 17 may be extended to a machine allowing mismatch (wrong word/omitted word/wrong insertion) by increasing the number of states as shown in FIG. 18. Specifically, a state A0 in FIG. 18 is an acceptance state which does not allow mismatch while a state A1 is an acceptance state allowing one wrong character and a state A2 is an acceptance state allowing two wrong characters.

As a method for the fuzzy retrieval, a technique of performing pattern matching using shift operation is described in Ricardo A. Baeza-Yates and Gaston H. Connet, A new approach to text searching, Communications of the ACM, Vol.35, No.10, October 1992, pp.74–82, and Sun Wu and Udi Manber, Agrep—a fast approximate pattern—matching tool, In Proceedings of USENIX Technical Conference, San Francisco, Calif., January 1992, pp.153–162. Also, realization of the fuzzy retrieval by hardware is described in Hachiro Yamada, Kosuke Takahashi, Masaki Hirata, and Hajime Nagai, Character array retrieval LSI capable of fuzzy retrieval, Nikkei Electronics, No.422, Jun. 1, 1987, pp.165–181. In addition, the inventor of the present application has already disclosed a method of fuzzy retrieval in a paper (Information Processing Society of Japan, January 1996, pp.13–23), etc. Therefore, the method of fuzzy retrieval will not be described in detail here. In the fuzzy retrieval, it is also possible to retrieve a candidate word by inputting several arbitrary characters in the character array in the appearing order within the character array, instead of inputting the leading character of the character array.

Figure 19:
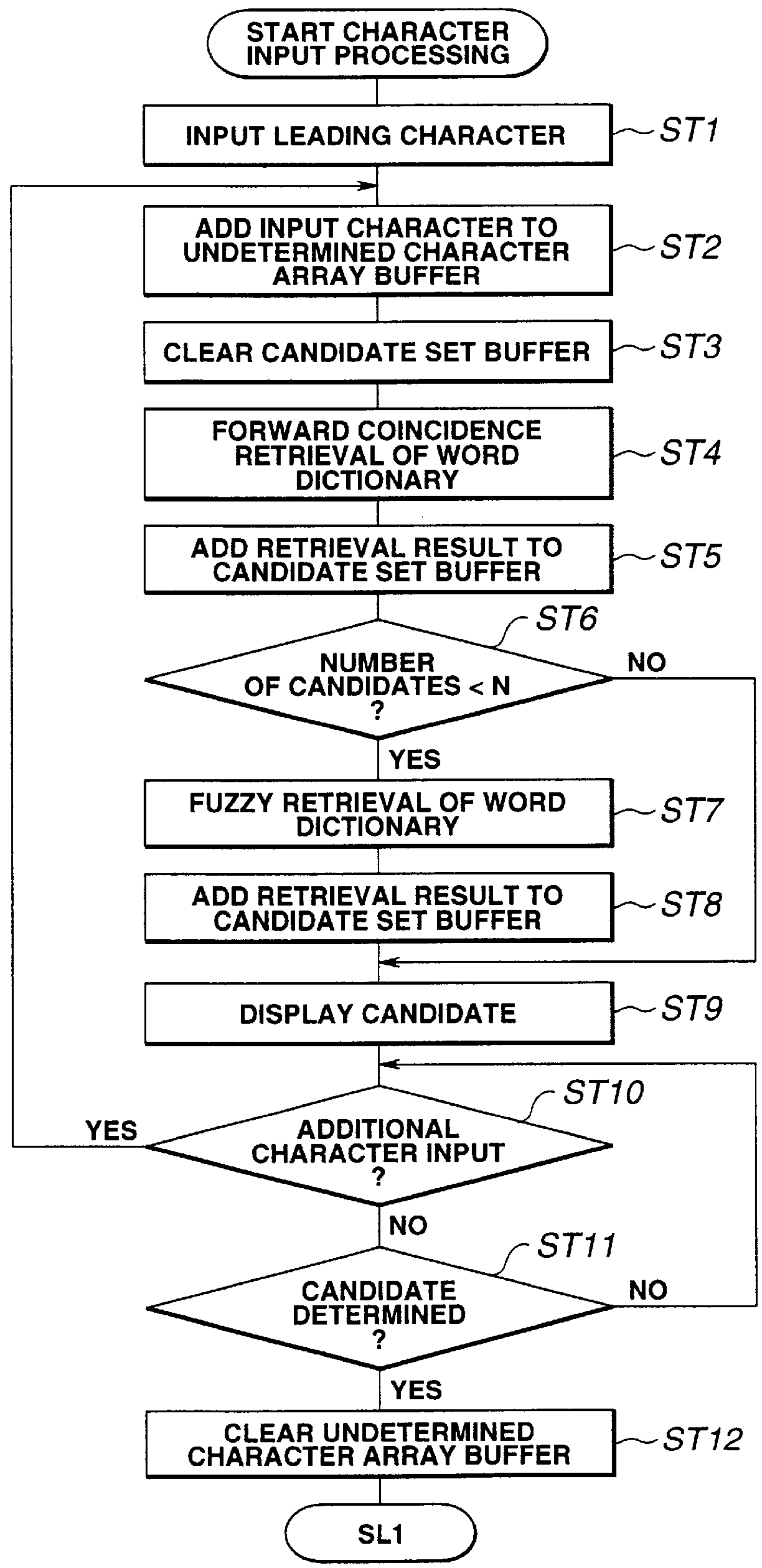
FIG. 19 is a flowchart showing the former half of character input processing in the pen-input computer of the embodiment of the present invention.
Figure 20:
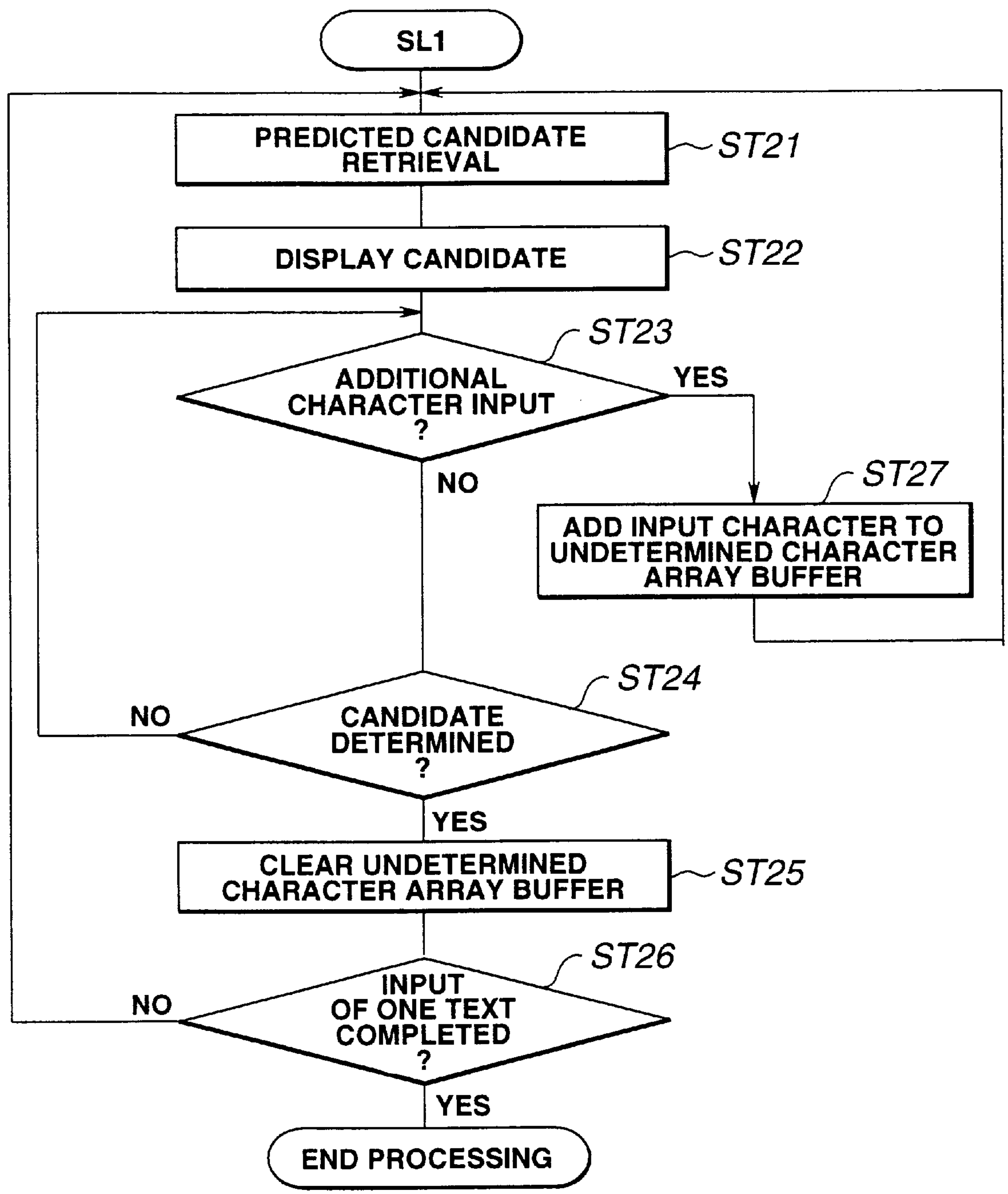
FIG. 20 is a flowchart showing the latter half of the character input processing in the pen-input computer of the embodiment of the present invention.
Figure 21:
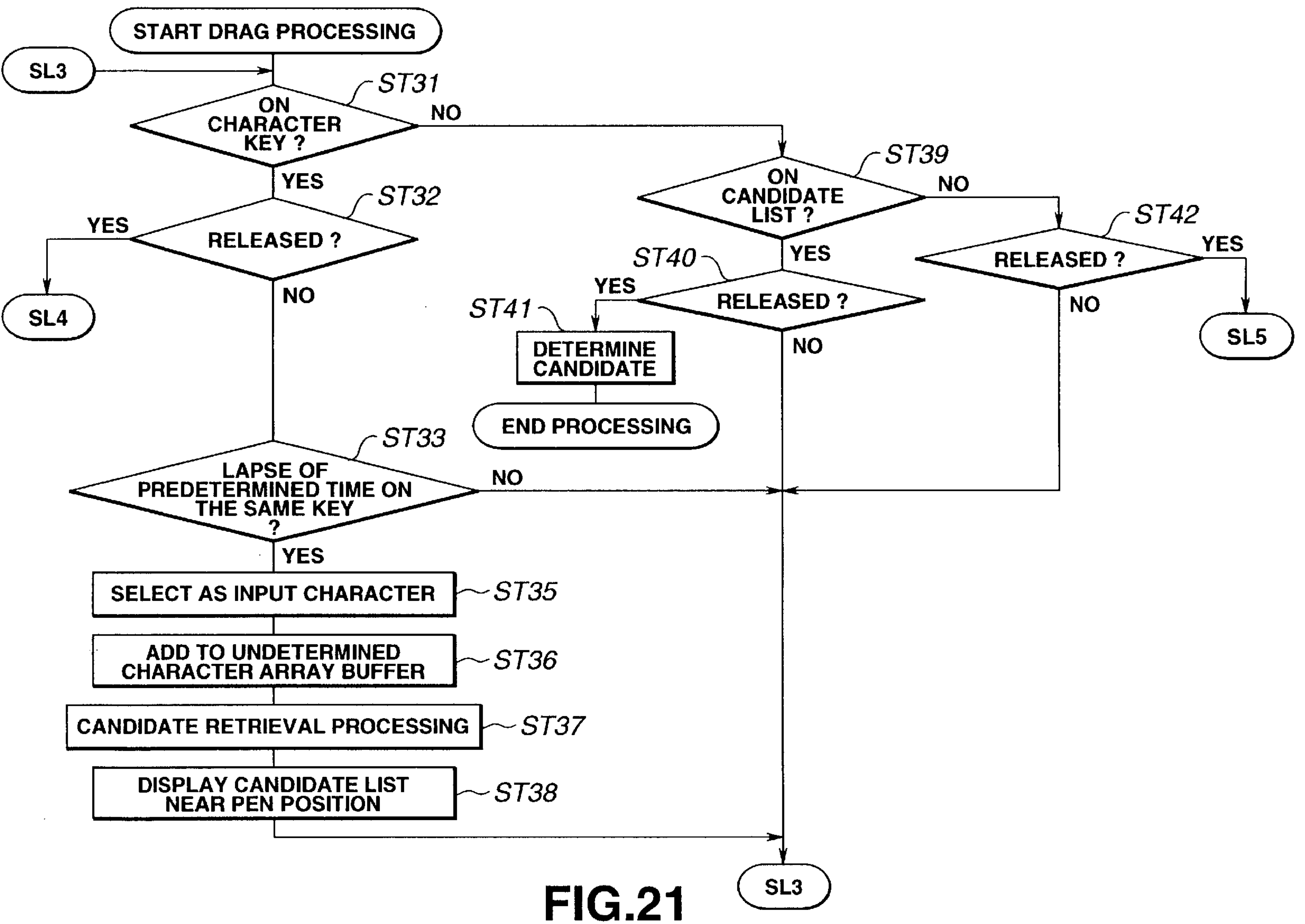
FIG. 21 is a flowchart showing the former half of drag processing.
Figure 22:
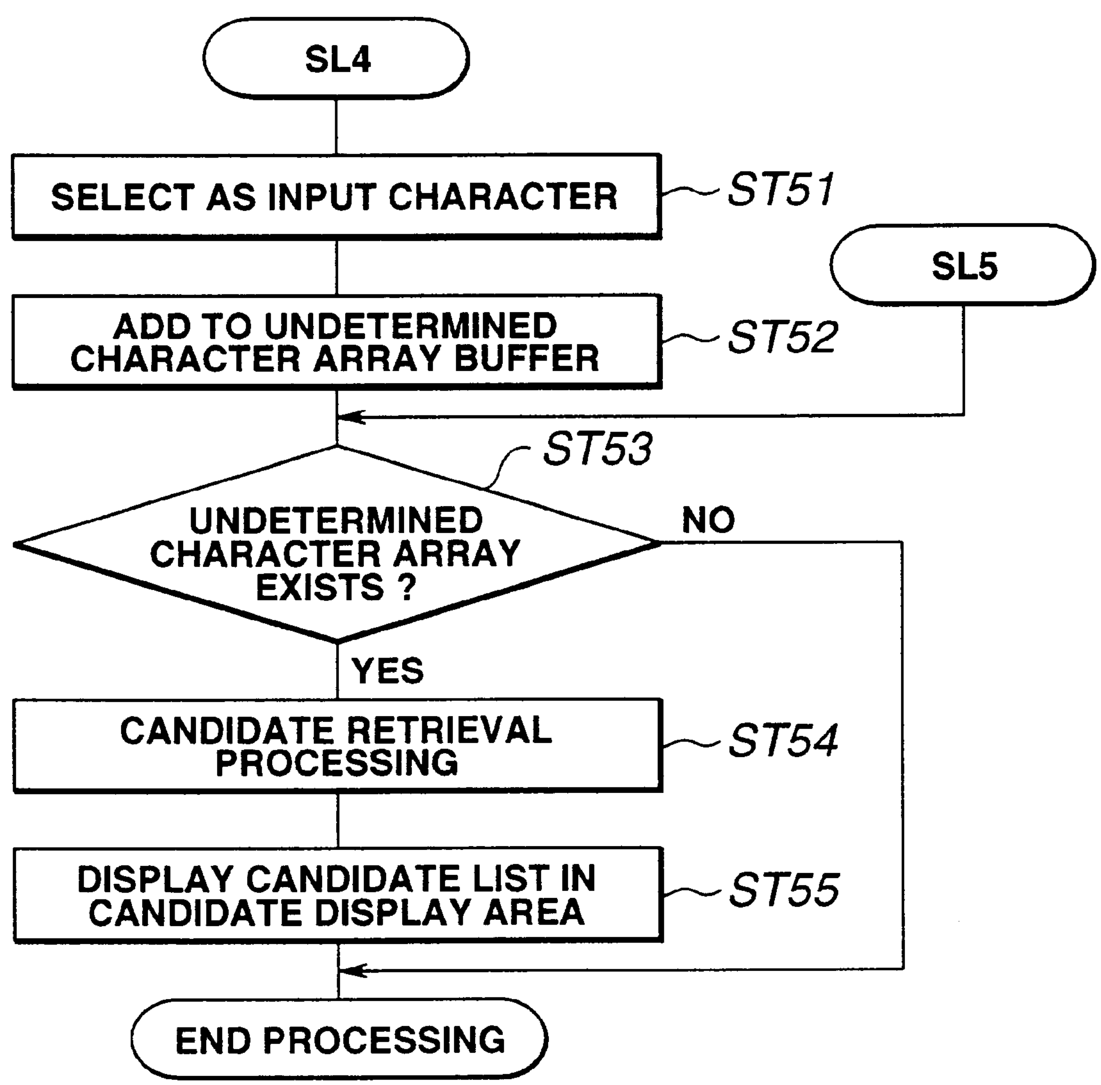
FIG. 22 is a flowchart showing the latter half of the drag processing.
Figure 23:
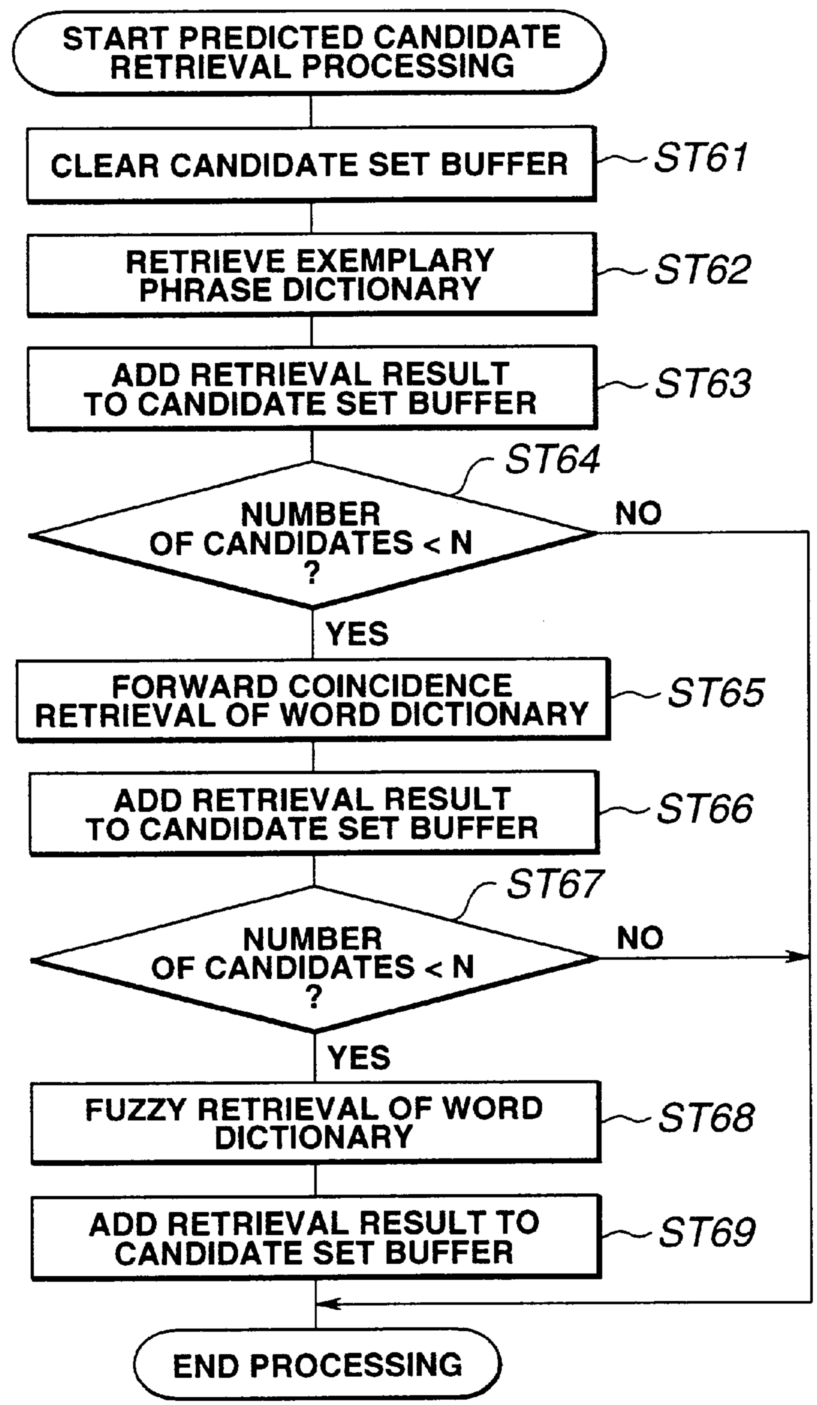
FIG. 23 is a flowchart of predicted candidate retrieval processing.

Hereinafter, flows of processing in the structure of FIG. 1 for realizing the specific text input as described above will be described with reference to flowcharts of FIGS. 19 to 23. The processing of these flowcharts is realized as the CPU 1 controls each constituent element and performs data processing in accordance with the text input program stored in the ROM 2. That is, the text input program stored in the ROM 2 is a program for the CPU 1 to execute the processing of the flowcharts. FIGS. 19 and 20 show an entire flow of character input processing in the pen-input computer 30 having the structure of FIG. 1. Although FIGS. 19 and 20 should be presented in one drawing, the flow is divided into two parts because of the limited space. FIGS. 21 and 22 shows a flowchart of the case where plural characters are continuously inputted as retrieval conditions in the character input processing (i.e., the drag processing). Although FIGS. 21 and 22, too, should be presented in one drawing, the flow is divided into two parts because of the limited space. FIG. 23 shows a specific flow of predicted candidate retrieval processing within the flowchart of the character input processing.

First, referring to FIG. 19, a leading character of a character array to be inputted is inputted as the retrieval condition, at step ST1. That is, from among the soft keys of the respective characters on the soft keyboard, the reading of the leading character is inputted by the input pen 25 for designating the retrieval condition, as described above.

When the input of the leading character is done, the CPU 1 stores data of this input character into an undetermined character array buffer provided within the RAM 3 of FIG. 1, at step ST2, and clears a buffer for storing a set of candidate words (hereinafter referred to as candidate set buffer) provided within the RAM 3, at step ST3. The undetermined character array buffer is a buffer in which a character array designated as a retrieval condition is stored. The retrieval condition is constituted by not only one character but also a character array of two or more characters. Since the character array is not determined until the candidate word is selected, in this embodiment, the buffer for storing the character array designated as the retrieval condition is referred to as the undetermined character array buffer.

At step ST4, the CPU 1 performs retrieval of candidate words having a character (or character array) stored in the undetermined character array buffer as a leading character (or character array) from the word dictionary. Such retrieval using the leading character (or character array) as a keyword is referred to as forward coincidence retrieval. At step ST5, the CPU 1 stores the candidate words obtained by forward coincidence retrieval of the word dictionary at step ST4, into the candidate set buffer.

At step ST6, the CPU 1 judges whether or not the number of retrieved candidate words is smaller than a predetermined number N. This number N corresponds to the number which may be displayed on the screen DPY as described above, for example, the number of candidate words displayed as the pull-down menu PDM or the pop-up menu PUM. If it is judged at step ST6 that the number of candidate words is N or greater (i.e., NO), the operation proceeds to step ST9 as later described. If it is judged that the number of candidate words is smaller than N (i.e., YES), the operation proceeds to step ST7.

At step ST7, since the number of retrieved candidate words is still smaller than the number N which may be displayed on the screen DPY, further retrieval of candidate words from the word dictionary is performed. The retrieval in this case is the fuzzy retrieval. The number of candidate words retrieved by the fuzzy retrieval may be the number defining the number which may be displayed on the screen DPY, together with the number of previously retrieved candidate words. After the fuzzy retrieval of step ST7, at step ST8, the CPU 1 adds the obtained retrieval results (the set of candidate words) to the candidate set buffer. At step ST9, the CPU 1 reads out the set of candidate words stored in the candidate set buffer and displays the candidate words as a menu (the pull-down menu or the pop-up menu) on the liquid crystal display panel 8.

At step ST10, the CPU 1 judges whether there is input of an additional character or not, that is, whether or not one character (reading) to be added as a retrieval condition is newly inputted by the input pen 25, or whether or not a character array is inputted by the drag processing. If there is input of an additional character at step ST10 (i.e., YES), the operation returns to step ST2, where the added character is added to the character (or character array) previously stored in the undetermined character array buffer and is stored in the undetermined character array buffer. After that, the processing from step ST3 to step ST10 is similarly performed, using the character array stored in the undetermined character array buffer as the retrieval condition. Similar processing is performed when there is further input of an additional character at step ST10.

If it is judged that there is no input of an additional character at step ST10, the CPU 1 judges at step ST11 whether the candidate word has been determined or not, that is, whether or not the correct candidate word has been selected from the pull-down menu or the pop-up menu \displayed on the screen DPY. If the candidate word has not been determined at step ST11 (i.e., NO), the operation returns to step ST10. If the candidate word has been determined (i.e., YES), the operation proceeds to step ST12.

As the candidate word has been determined, the CPU 1 clears the undetermined character array buffer at step ST12 in order to proceed to the next character input processing. Then, the CPU 1 performs the processing of step ST21 and subsequent steps in FIG. 20. Since the input of at least one word has already been determined by the processing of the flowchart of FIG. 19, predicted candidate retrieval for predicting a candidate word which should follow the determined word (for example, a candidate word having the highest appearance frequency) is performed on the basis of the determined word (character array), at step ST21 of FIG. 20. As a set of candidate words is obtained by the predicted candidate retrieval, the CPU 1 displays the set of candidate words on the liquid crystal display panel 8 at step ST22.

At step ST23, the CPU 1 judges whether there is input of an additional character or not, that is, whether or not one character to be added as a retrieval condition is newly inputted by the input pen 25, or whether or not a character array is inputted by the drag processing.

If there is input of an additional character at step ST23 (i.e., YES), the newly added character is added to the character (or character array) stored in the undetermined character array buffer and is stored in the undetermined character array buffer at step ST27. After that, the processing from step ST21 to step ST23 is performed similarly, using the character array stored in the undetermined character array buffer as the retrieval condition. Similar processing is performed when there is further input of an additional character at step ST23.

If it is judged that there is no input of an additional character at step ST23, the CPU 1 judges at step ST24 whether determination of the candidate word has been completed or not, that is, whether or not the correct candidate word has been selected from the pull-down menu PDM or the pop-up menu PUM displayed on the screen DPY. If it is judged at step ST24 that the candidate word has not been determined (i.e., NO), the operation returns to step ST23. If the candidate word has been determined (i.e., YES), the operation proceeds to step ST25.

The CPU 1 clears the undetermined character array buffer at step ST25, and then proceeds to step ST26. At step ST26, the CPU 1 judges whether input of one text has been completed or not. If it is judged at step ST26 that the input has not been completed (i.e., NO), the operation returns to step ST21 and the processing from step ST21 to step ST26 is repeated until it is judged at step ST26 that the input has been completed. When it is judged at step ST26 that the input has been completed (i.e., YES), the character input processing ends.

Referring to FIGS. 21 and 22, the flow of the drag processing is hereinafter described.

First, in FIG. 21, the CPU 1 judges at step ST31 whether or not the input pen 25 is located on the screen DPY of the liquid crystal display panel 8, that is, on the soft keyboard SKBJ (more specifically, whether or not the input pen 25 is located on the pressure-sensitive tablet 9 corresponding to the character soft key sk on the soft keyboard SKBJ). If it is judged at this step ST31 that the input pen 25 is located on the character soft key sk (i.e., YES), the operation proceeds to step ST32. If it is judged that the input pen 25 is not located on the character soft key sk (i.e., NO), the operation proceeds to step ST39.

As it is judged at step ST31 that the input pen 25 is located on the character soft key sk, the CPU 1 judges at step ST32 whether the input pen 25 has been released from the screen DPY or not (more specifically, whether the input pen 25 has been released from the pressure-sensitive tablet 9 or not). If it is judged that the input pen has not been released, the operation proceeds to step ST33. If it is judged that the input pen has been released, the operation proceeds to step ST51 of FIG. 22.

When it is judged at step ST32 that the input pen 25 has not been released from the screen DPY, the CPU 1 judges at step ST33 whether or not a predetermined time has lapsed since the input pen 25 was put on the same character soft key sk. If it is judged at step ST33 that the predetermined time has not lapsed, the operation returns to step ST31. If it is judged that the predetermined time has lapsed, the operation proceeds to step ST35.

As it is judged at step ST33 that the predetermined time has lapsed since the input pen 25 was put on the same character soft key sk, the CPU 1 selects the character of that soft key sk as an input character, at step ST35. At step ST36, the CPU 1 stores the character into the undetermined character array buffer (or adds this character if any character has already been stored).

At step ST37, the CPU 1 performs candidate word retrieval processing using the character array stored in the undetermined character array buffer. In addition, at step ST38, the CPU 1 displays a set of candidate words obtained by the retrieval onto the screen DPY. The display position of the set of candidate words is set near the character soft key on which the input pen 25 is located, as in the above-described pull-down menu PDM. After the processing of step ST38 is completed, the operation returns to step ST31.

On the other hand, if it judged at step ST31 that the input pen 25 is not located on the character soft key sk, the CPU 1 judges at step ST39 whether or not the input pen 25 is located on the pull-down menu PDM or the pop-up menu PUM in which the set of candidate words is displayed (more specifically, whether or not the input pen 25 is in contact with the pressure-sensitive tablet 9 corresponding to the menu key mk displaying the candidate word on the menu). If it is judged at step ST39 that the input pen 25 is located on the menu key mk, the operation proceeds to step ST40. If it is judged that the input pen 25 is not located on the menu key mk, the operation proceeds to step ST42.

As it is judged at step ST39 that the input pen 25 is located on the menu key mk, the CPU 1 judges at step ST40 whether or not the input pen 25 has been released from the screen DPY. If it is judged that the input pen has been released, the operation proceeds step ST41. If it is judged that the input pen has not been released, the operation returns to step ST31.

When it is judged at step ST40 that the input pen 25 has been released from the screen DPY, the CPU 1 assumes that selection of the candidate word is completed at step ST41 and ends the drag processing.

On the other hand, when it is judged at step ST39 that the input pen 25 is not located on the menu key mk, the CPU 1 judges at step ST42 whether or not the input pen 25 has been released from the screen DPY. If it is judged that the input pen has been released, the operation proceeds to step ST53 of FIG. 22. If it is judged that the input pen has not been released, the operation returns to step ST31.

Moreover, when it is judged at step ST32 that the input pen 25 has been released from the screen DPY, the CPU 1 selects the character on the character soft key sk as an input character at step ST51 of FIG. 22. At the next step ST52, the CPU 1 stores that character into the undetermined character array buffer (or adds that character if any character has already been stored).

After that, the operation of the CPU 1 proceeds to step ST53. Also in the case where judgment YES is made at step ST42 of FIG. 21, the operation proceeds to this step ST53.

At step ST53, the CPU 1 judges whether or not a character array as the retrieval condition is stored in the undetermined character array buffer. If it is judged that the character array is not stored, the drag processing ends. If it is judged that the character array is stored, the operation proceeds to step ST54.

At step ST54, the CPU 1 performs candidate word retrieval using the character array stored in the undetermined character array buffer. At step ST55, the CPU 1 displays a set of candidate words obtained by the retrieval, in a menu, and then ends the drag processing.

The flow of predicted candidate retrieval processing at step ST21 of FIG. 20 is hereinafter described with reference to the flowchart of FIG. 23.

In FIG. 23, the CPU 1 first clears the candidate set buffer at step ST61, and performs retrieval of the above-described exemplary phrase dictionary at the next step ST62. After the retrieval of the exemplary phrase dictionary, the CPU 1 stores candidate words obtained by the retrieval into the candidate set buffer (or adds the candidate words if any candidate word has already been stored), at step ST63.

At step ST64, the CPU 1 judges whether the number of retrieved candidate words is smaller than the predetermined number N or not. If it is judged at step ST64 that the number of candidate words is N or greater, the predicted candidate retrieval processing ends. If it is judged that the number of candidate words is smaller than N, the operation proceeds to step ST65.

At step ST65, the CPU 1 performs the forward coincidence retrieval of the word dictionary. At the next step ST66, the CPU 1 stores candidate words obtained by the retrieval into the candidate set buffer (or adds the candidate words if any candidate word has already been stored).

After that, at step ST67, the CPU 1 judges again whether the number of retrieved candidate words is smaller than the predetermined number N or not. If it is judged at step ST67 that the number of candidate words is N or greater, the predicted candidate retrieval processing ends. If it is judged that the number of candidate words is smaller than N, the operation proceeds to step ST68.

At step ST68, the CPU 1 performs the fuzzy retrieval of the word dictionary. At the next step ST69, the CPU 1 stores candidate words obtained by the retrieval into the candidate set buffer (or adds the candidate words if any candidate word has already been stored). Thus, the predicted candidate retrieval processing ends.

Next, results of measurement of text input time and operability test at the time of portable use, using the pen-input computer realizing the above-described text input method of the present embodiment will be described in comparison with the text input using the conventional pen-input computer.

FIG. 24 shows the results of measurement of the time required for inputting an exemplary phrase composed of 128 characters, using the pen-input computer of the present embodiment and the existing pen-input computer. The results are obtained on the assumption of the same testee.

From FIG. 24, it is understood that the pen-input computer of the embodiment to which the text input method of the present invention is applied enables input of the exemplary phrase of 128 characters in 120 seconds (64 characters/minute). On the contrary, with the existing pen-input computer, the input of the exemplary phrase of 128 characters takes at least 260 seconds (30 characters/minute) and 320 seconds (24 characters/minute) in the worst case. From these results, it is understood that the pen-input computer of the present embodiment achieves a significantly higher text input speed than the existing pen-input computer.

Also, the pen-input computer enables easy text input and editing even in a shaky environment as in a moving train and even though the user is standing in the train, while input by the existing pen-input computer for handwritten input is difficult in a shaky environment as in a moving train.

Thus, the pen-input computer of the present embodiment realizes the high-speed text input method with the pen utilizing dynamic retrieval of candidate words and prediction from exemplary phrases.

Referring to FIGS. 25 to 31, the word finding rate and the finding speed at the time of candidate retrieval in the pen-input computer of the embodiment of the present invention will now be described briefly.

Figure 25:
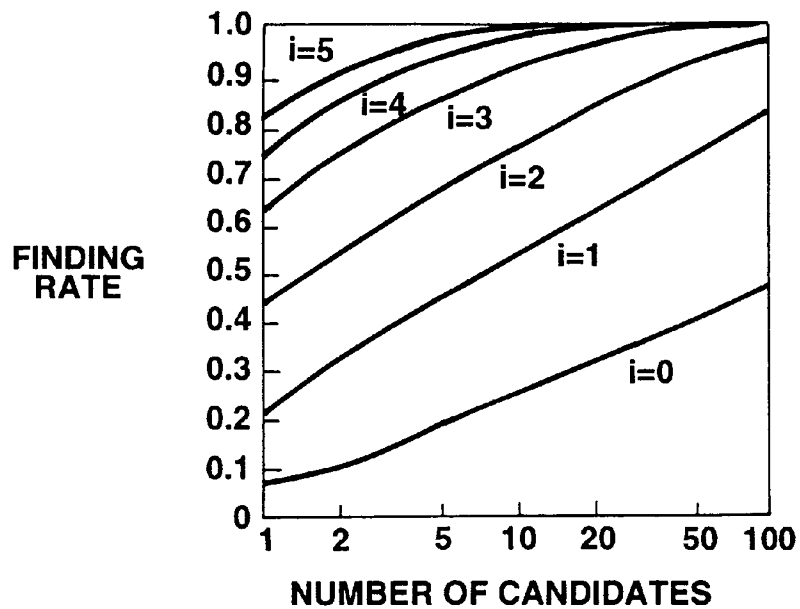
FIG. 25 illustrates the relation between the number of pen operating times, the number of candidates displayed in the menu, and the probability that a desired word will exist in the menu, in the case where English input is performed.
Figure 26:
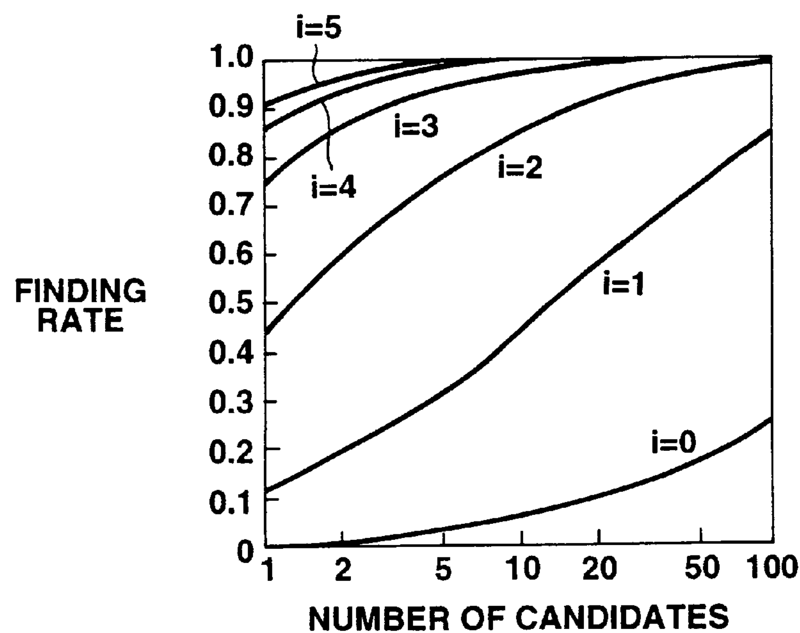
FIG. 26 illustrates the relation between the number of pen operating times, the number of candidates displayed in the menu, and the probability that a desired word will exist in the menu, in the case where Japanese input is performed.
Figure 27:
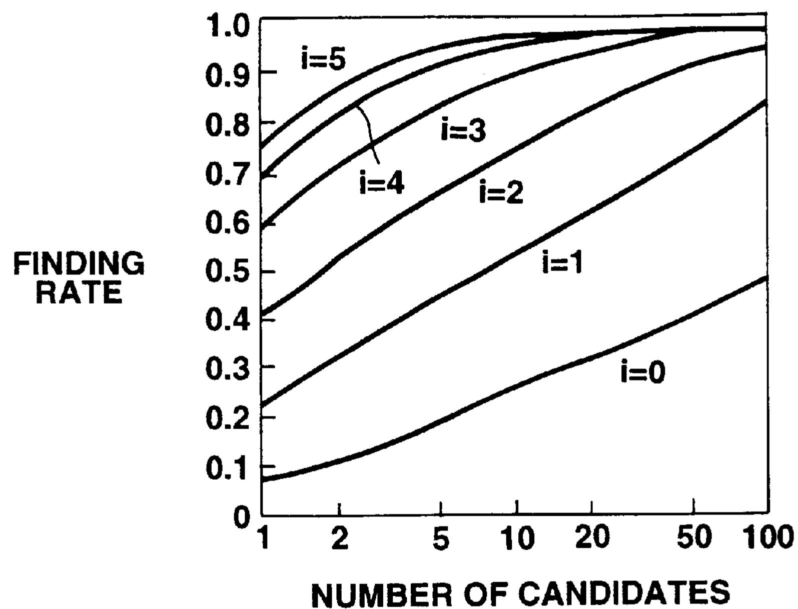
FIG. 27 illustrates the relation between the number of pen operating times, the number of candidates displayed in the menu, and the probability that a desired word will exist in the menu, in the case where English input is performed while predicted candidate retrieval is not performed.
Figure 28:
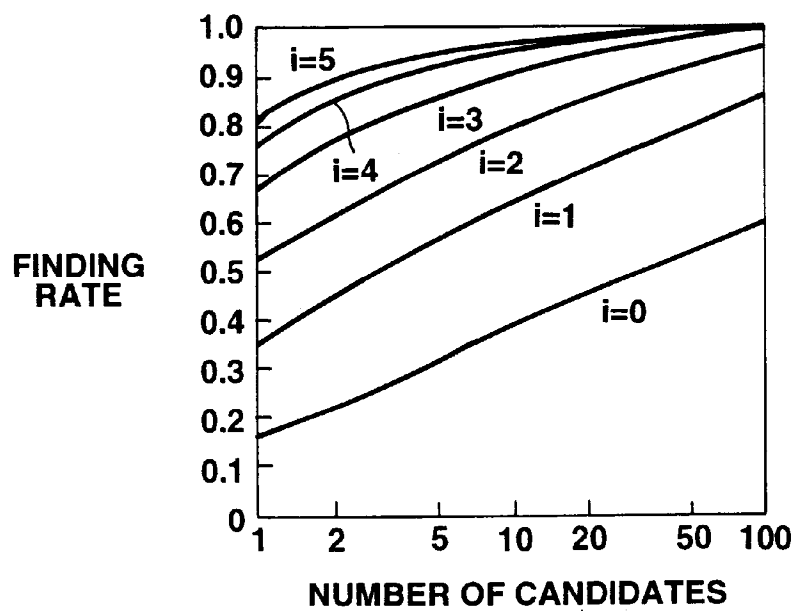
FIG. 28 illustrates the relation between the number of pen operating times, the number of candidates displayed in the menu, and the probability that a desired word will exist in the menu, in the case where English input is performed while predicted candidate retrieval is performed.
Figure 29:
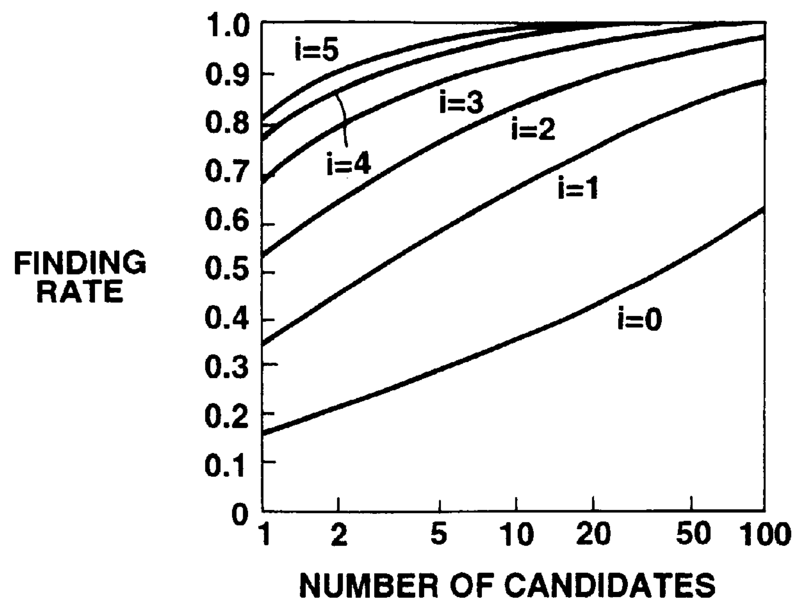
FIG. 29 illustrates the relation between the number of pen operating times, the number of candidates displayed in the menu, and the probability that a desired word will exist in the menu, in the case where English input is performed while predicted candidate retrieval and adaptive retrieval using the dictionary are performed.

FIGS. 25 to 29 show the relations between the number of pen operating times i (i=0, 1, 2, 3, 4, 5), the number of candidates displayed in the menu on the screen, and the probability that a desired word will exist in the menu in the case where text input is performed. FIG. 25 illustrates the case where English input is performed. FIG. 26 illustrates the case where Japanese input is performed. FIG. 27 illustrates the case where English input is performed while predicted candidate retrieval is not performed. FIG. 28 illustrates the case where English input is performed while predicted candidate retrieval is performed. FIG. 29 illustrates the case where English input is performed while predicted candidate retrieval and adaptive retrieval using the dictionary are performed. From FIGS. 25 to 29, it is understood that a desired candidate word may be found with a small number of pen operating times and may be found more easily by predicted candidate retrieval and the like.

Figure 30:
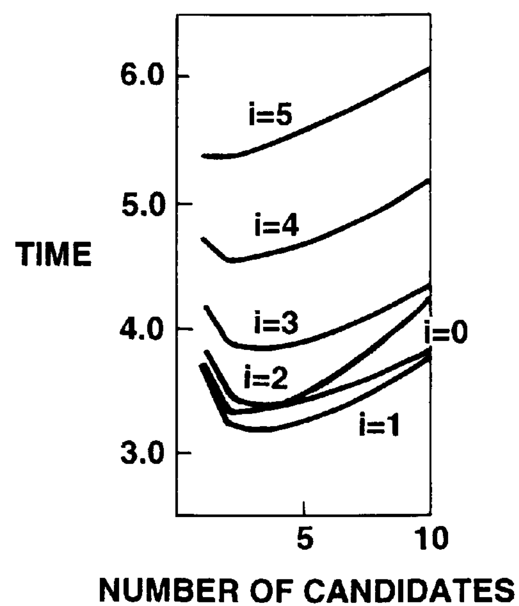
FIG. 30 illustrates the relation between the number of pen operating times, the number of candidates displayed in the menu, and the time until a desired candidate word is selected from the menu display and determined, in the case where text input is performed without performing predicted candidate retrieval.
Figure 31:
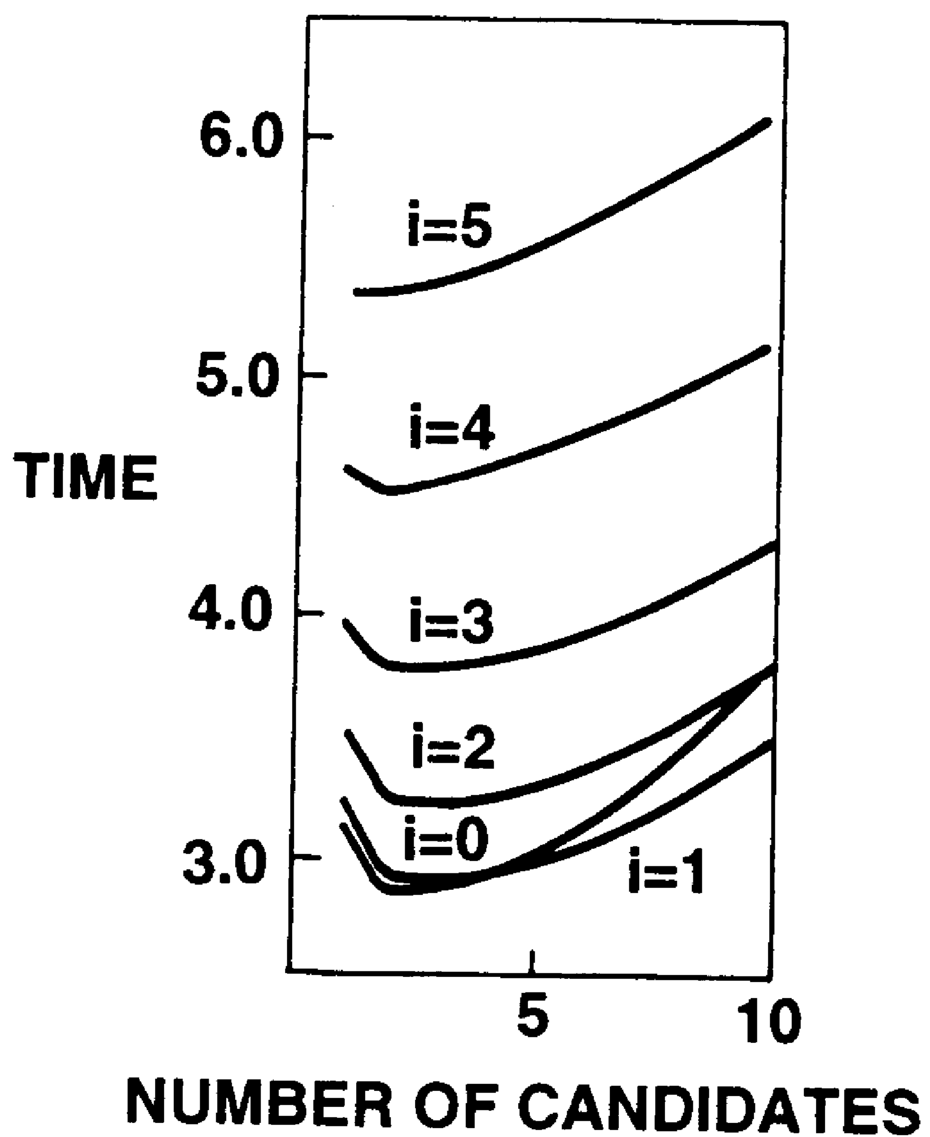
FIG. 31 illustrates the relation between the number of pen operating times, the number of candidates displayed in the menu, and the time until a desired candidate word is selected from the menu display and determined, in the case where text input is performed while predicted candidate retrieval is performed.

FIGS. 30 and 31 shows the relation between the number of pen operating times i (i=1, 2, 3, 4, 5), the number of candidates displayed in the menu on the screen, and the time until a desired candidate word is selected from the menu display and determined. FIG. 30 illustrates the case where predicted candidate retrieval is not performed. FIG. 31 illustrates the case where predicted candidate retrieval is performed. From FIGS. 30 and 31, it is understood that a desired candidate word may be found with a small number of pen operating times and may be found more easily by predicted candidate retrieval and the like.

Figure 32:
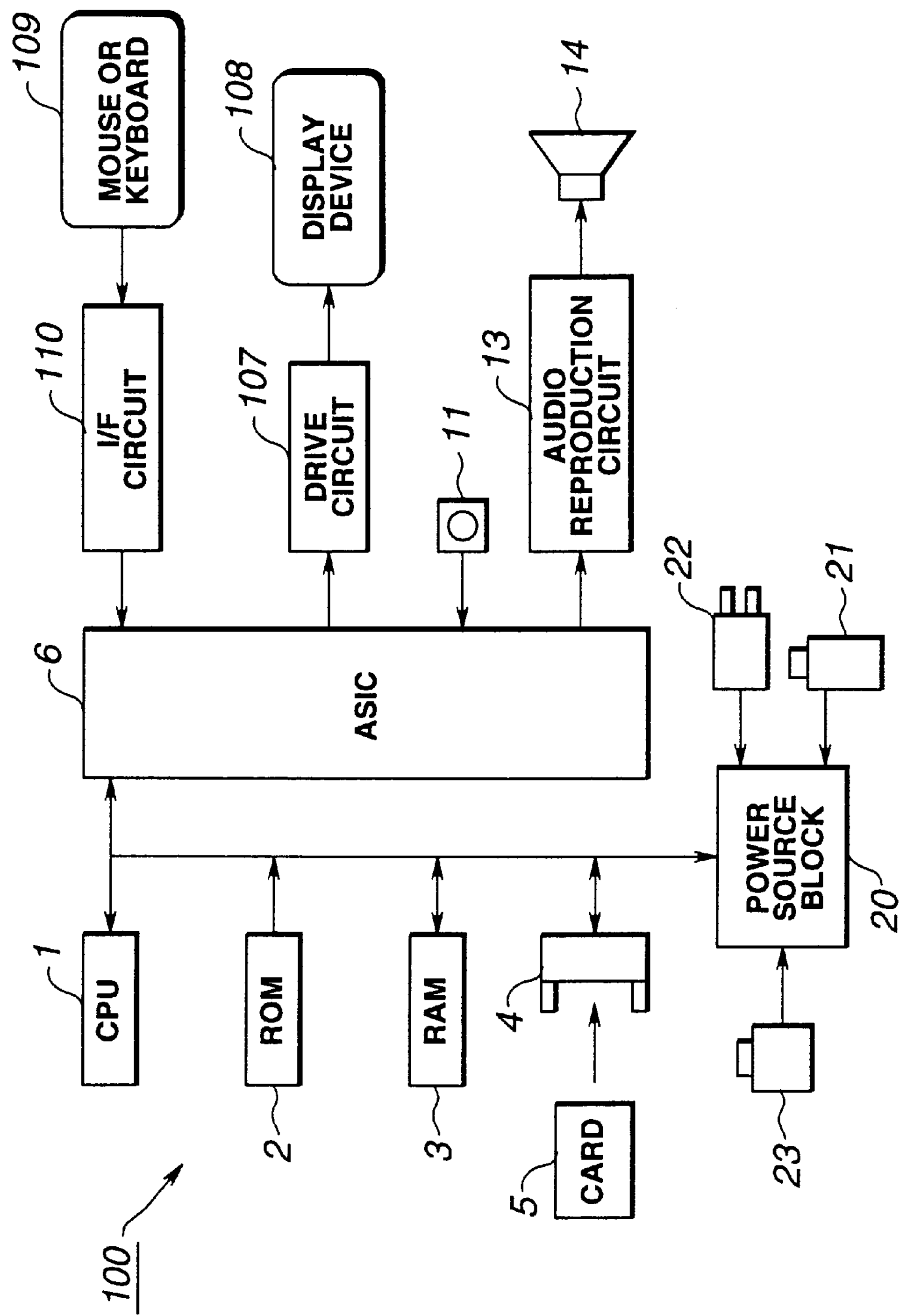
FIG. 32 is a block circuit diagram showing a schematic circuit structure of another embodiment of the present invention.

Finally, FIG. 32 shows the schematic structure of a computer 100 for realizing the text input method according to the present invention by using a so-called mouse or hardware keyboard. In FIG. 32, constituent elements similar to those of FIG. 1 are denoted by the same reference numerals and will not described further in detail.

In the structure of FIG. 32, as means for performing designation of the retrieval condition and selection of the candidate word, a mouse or keyboard 109 and an interface circuit 110 with the computer body are provided in place of the pressure-sensitive tablet 9 and the analog/digital converter 10 of FIG. 1, and a display drive circuit 107 and a display device 108 are used in place of the liquid crystal drive circuit 7 and the liquid crystal display panel 8 of FIG. 1. The display device 108 is a cathode ray tube which is often used for a desk-top computer, or a liquid crystal display used for a portable computer. Therefore, the drive circuit 107 and the display device 108 of the structure of FIG. 32 need not necessarily replace but may be the same as the liquid crystal drive circuit 7 and the liquid crystal display panel 8 of FIG. 1.

In the structure of FIG. 32, in the case where the mouse is used, a soft keyboard and edit command soft keys similar to those described above are displayed on the display device 108, and a cursor as an indication mark operated by the mouse is also displayed. Thus, by shifting the mouse cursor onto a desired soft key of the soft keyboard and clicking the mouse there, designation of the soft key, that is, designation of the retrieval condition may be performed. Similarly, in the case of candidate word selection, selection of a desired candidate word may be realized by shifting the mouse cursor onto a desired menu key and clicking the mouse there.

In addition, in the structure of FIG. 32, in the case where the hardware keyboard is used, the hardware keyboard operates as the soft keyboard so that designation of the retrieval condition may be performed by operating the keys on the hardware keyboard. When the retrieval condition is thus designated, for example, a menu for displaying the candidate words is displayed on the screen. To select a desired candidate word from the menu, the mouse cursor or the cursor shift keys provided on the hardware keyboard are operated to shift the cursor onto the desired candidate word and selection of the candidate word is executed by a determination key (return key), for example. In the case where hardware structure keys which are the same as the edit command soft keys are provided on the hardware keyboard, the keys are used to perform editing or the like.

With the structure of FIG. 32, too, effects similar to those in the embodiment of FIG. 1 may be obtained.

As a matter of course, the present invention may be applied to a pen-input computer for so-called handwritten input. In the case of handwritten input, a handwritten input area is provided on the screen of the pen-input computer so that which character is indicated by a gesture drawn in the area is recognized, thus performing designation of the retrieval condition and selection of the candidate word, similar to those described above, in accordance with the recognition results.

As is clear from the above description, the present invention provides the text input device and method suitable for a pen-input computer based on retrieval and prediction of characters, words, and sentences, etc. By repeating the operation of selecting a word from a set of candidate words which are selectively collected by partial designation of reading and prediction from a character array immediately before the input position, the present invention enables text input at a high speed which is twice or more of the speed of the conventional character input method based on handwritten character recognition and kana-kanji conversion.

What is claimed is:

1. A text input device to input a desired character string, the text input device comprising:

display means capable of displaying at least a character;

dictionary storage means storing character strings including a plurality of words and a plurality of exemplary phrases;

pen input means for performing input of only a portion of the character string and selective input of a menu item displayed on the display means by contacting the pen input means to the display means; and retrieval means for retrieving a plurality of stored character strings from the dictionary storage means for display as the menu items of a pulldown menu on the display means, on the basis of the portion of the character string input from the input means and/or an already determined character array;

popup menu display means for displaying the menu items in a popup menu on the display means in response to the input pen means being released from the display means;

wherein the desired character string is selectable by the input means from the plurality of character strings displayed as the menu items in either the pulldown menu or the popup menu on the display means so as to perform the text input.

2. The text input device as claimed in claim 1, wherein the input pen means has coordinate position indication means for indicating a display coordinate position on the display means, the input pen means performing the input of the portion of the character string and the selective input of the menu item by contacting the display means to cause the coordinate position indication means to indicate the display coordinate position of each character of the portion of the character string displayed on the display means and the display coordinate position of each menu item displayed on the display means.

3. The text input deviyce as claimed in claim 2, wherein the coordinate position indication means has coordinate position corresponding means for causing a physical coordinate position on the display means and the display coordinate position on the display means to correspond to each other, and coordinate position input means for inputting the physical coordinate position to the coordinate position corresponding means, the coordinate position indication means indicating the display coordinate position of each unit character of the portion of the character string displayed on the display means and the display coordinate position of each menu item displayed on the display means by causing the coordinate position input means to input the physical coordinate position.

4. The text input device as claimed in claim 3, wherein the coordinate position corresponding means is a pressure-sensitive tablet for causing the physical coordinate position and the display coordinate position to correspond to each other, and the coordinate position input means is an input pen for inputting the coordinate position to the pressure-sensitive tablet.

5. The text input device as claimed in claim 2, wherein the coordinate position indication means has an indication mark generation means for generating an indication mark displayed on the display means, indication mark shift means for shifting the indication mark on the display means, and coordinate position intake means for taking information of the display coordinate position where the indication mark exists on the display means.

6. The text input device as claimed in claim 1, wherein the retrieval means retrieves a plurality of words having the portion of the character string inputted from the input means as a leading portion, from the dictionary storage means.

7. The text input device as claimed in claim 6, wherein the retrieval means retrieves the plurality of words having the portion of the character string inputted from the input means as the leading portion, sequentially from a word having the highest appearance frequency.

8. The text input device as claimed in claim 6, wherein the retrieval means retrieves the plurality of words having the portion of the character string inputted from the input means as the leading portion, sequentially from a word selected in the temporally nearest past.

9. The text input device as claimed in claim 1, wherein the retrieval means retrieves a plurality of words, each containing a plurality of unit characters of the portion of the character string inputted from the input means as constituent elements, from the dictionary storage means.

10. The text input device as claimed in claim 9, wherein the retrieval means retrieves the plurality of words, each containing the plurality of unit characters of the portion of the character string sequentially inputted from the input means as constituent elements in the order of the input.

11. The text input device as claimed in claim 9, wherein the retrieval means retrieves the plurality of words, each containing the plurality of unit characters of the portion of the character string inputted from the input means as constituent elements, sequentially from a word having the highest appearance frequency.

12. The text input device as claimed in claim 9, wherein the retrieval means retrieves the plurality of words, each containing the plurality of unit characters of the portion of the character string inputted from the input means as constituent elements, sequentially from a word selected in the temporally nearest past.

13. The text input device as claimed in claim 1, wherein the retrieval means predicts and retrieves a plurality of words appearing subsequently to the already determined character array.

14. The text input device as claimed in claim 13, wherein the retrieval means predicts and retrieves the plurality of words sequentially from a word having the highest frequency of appearing subsequently to the already determined character array.

15. The text input device as claimed in claim 13, wherein the retrieval means retrieves the plurality of words to be predicted and retrieved sequentially from a word selected in the temporally nearest past.

16. A text input method to input a desired character string, the method comprising:

a display step of displaying at least a character on a display screen;

an input step of contacting a pen with the display means to perform input of only a portion of the character string and selective input of a menu item displayed on the display screen; and a retrieval step of retrieving a plurality of stored character strings for display as a pulldown menu of the menu items on the display screen from a dictionary storing character strings including a plurality of words and a plurality of exemplary phrases, on the basis of the pen contact input by the input step and/or an already determined character array;

a popup menu display step of displaying the menu items in a popup menu upon release of the pen from the display means;

wherein the desired character string is selected by the input step from the plurality of character strings displayed as the menu items on the display screen so as to perform the text input.

17. The text input method as claimed in claim 16, wherein at the input step, the input of the portion of the character string and the selective input of the menu item is performed by indicating a display coordinate position of each unit character of the portion of the character string displayed on the display screen by contacting the pen with the display means and a display coordinate position of each menu item displayed on the display screen.

18. The text input method as claimed in claim 17, wherein the input step includes an indication mark generation step of generating an indication mark displayed on the display screen, an indication mark shift step of shifting the indication mark on the display screen, and a coordinate position intake step of taking information of the display coordinate position where the indication mark exists on the display screen.

19. The text input method as claimed in claim 16, wherein at the retrieval step, a plurality of words having the portion of the character string inputted at the input step as a leading portion are retrieved from the dictionary.

20. The text input method as claimed in claim 19, wherein at the retrieval step, the plurality of words having the portion of the character string inputted at the input step as the leading portion are retrieved sequentially from a word having the highest appearance frequency.

21. The text input method as claimed in claim 19, wherein at the retrieval step, the plurality of words having the portion of the character string inputted at the input step as the leading portion are retrieved sequentially from a word selected in the temporally nearest past.

22. The text input method as claimed in claim 16, wherein at the retrieval step, a plurality of words, each containing a plurality of unit characters of the portion of the character string inputted at the input step as constituent elements, are retrieved from the dictionary.

23. The text input method as claimed in claim 22, wherein at the retrieval step, the plurality of words, each containing the plurality of unit characters of the portion of the character string sequentially inputted at the input step as constituent elements in the order of the input, are retrieved.

24. The text input method as claimed in claim 22, wherein at the retrieval step, the plurality of words, each containing the plurality of unit characters of the portion of the character string inputted at the input step as constituent elements, are retrieved sequentially from a word having the highest appearance frequency.

25. The text input method as claimed in claim 22, wherein at the retrieval step, the plurality of words, each containing the plurality of unit characters of the character string inputted at the input step as constituent elements, are retrieved sequentially from a word selected in the temporally nearest past.

26. The text input method as claimed in claim 16, wherein at the retrieval step, a plurality of words appearing subsequently to the already determined character array are predicted and retrieved.

27. The text input method as claimed in claim 26, wherein at the retrieval step, the plurality of words are predicted and retrieved sequentially from a word having the highest frequency of appearing subsequently to the already determined character array.

28. The text input method as claimed in claim 26, wherein at the retrieval step, the plurality of words to be predicted and retrieved are retrieved sequentially from a word selected in the temporally nearest past.

* * * * *